(12) United States Patent
Bank et al.

(10) Patent No.: US 8,091,613 B2
(45) Date of Patent: Jan. 10, 2012

(54) THERMAL ENERGY STORAGE MATERIALS

(75) Inventors: David H. Bank, Midland, MI (US);
Andrey N. Soukhojak, Midland, MI (US); Kalyan Sehanobish, Rochester, MI (US); David G. McLeod, Rochester Hills, MI (US)

(73) Assignee: Dow Global Technologies LLC, Midland, MI (US)

( * ) Notice: Subject to any disclaimer, the term of this patent is extended or adjusted under 35 U.S.C. 154(b) by 75 days.

(21) Appl. No.: 12/389,416

(22) Filed: Feb. 20, 2009

(65) Prior Publication Data
US 2009/0211726 A1 Aug. 27, 2009

Related U.S. Application Data

(60) Provisional application No. 61/030,755, filed on Feb. 22, 2008, provisional application No. 61/061,908, filed on Jun. 16, 2008, provisional application No. 61/074,799, filed on Jun. 23, 2008, provisional application No. 61/074,840, filed on Jun. 23, 2008, provisional application No. 61/074,869, filed on Jun. 23, 2008, provisional application No. 61/074,889, filed on Jun. 23, 2008, provisional application No. 61/090,084, filed on Aug. 19, 2008.

(51) Int. Cl.
*F28D 17/00* (2006.01)

(52) U.S. Cl. ............................................. 165/10; 165/4

(58) Field of Classification Search .................. 165/4, 10
See application file for complete search history.

(56) References Cited

U.S. PATENT DOCUMENTS 2,375,760 A 1/1942 Fahnestock
3,475,596 A * 10/1969 Lawrence et al. ............... 165/10

(Continued)

FOREIGN PATENT DOCUMENTS

CN 1 26 39 24 A 8/2000

(Continued)

OTHER PUBLICATIONS

"KNO3-LiNO3" Data from FTsalt FACT salt databases, available at, http://www.crct.polymtl.ca/fact/phase_diagram.php?file=KNO3-LiNO3.,jpg&dir=FTsalt.

(Continued)

*Primary Examiner* — Ljiljana Ciric
(74) *Attorney, Agent, or Firm* — Dobrusin & Thennisch PC

(57) ABSTRACT

The present invention relates to a thermal energy storage material (TESM) system (and associated methods) that reproducibly stores and recovers latent heat. The Thermal energy storage material system comprises i) at least one first metal containing material including at least one first metal compound that includes a nitrate ion, a nitrite ion, or both; and ii) at least one second metal containing material including at least one second metal compound. The thermal energy storage material system may water. If any water is present in the thermal energy storage material system, the water concentration should be less than about 10 wt. %. The thermal energy storage material has a liquidus temperature, $T_L$, from about 100° C. to about 250° C. and exhibits a heat storage density from 300° C. to 80° C. of at least about 1 MJ/l, so that upon being used in a system that generates heat, at least a portion of the heat is captured and stored by the thermal energy storage material and subsequently released for use. The thermal energy storage material system is generally resistant to corrosion at temperatures of about 300° C. Exemplary metal compounds include one or more cations selected from the group consisting of Li, Na, K, Be, Mg, Ca, Al, and Ga.

20 Claims, 22 Drawing Sheets

U.S. PATENT DOCUMENTS

| | | | | |
|---|---|---|---|---|
| 3,501,261 A * | 3/1970 | Rice et al. | | 165/10 |
| 3,596,034 A * | 7/1971 | Mekjean | | 165/10 |
| 3,605,720 A | 9/1971 | Mayo | | |
| 3,949,554 A | 4/1976 | Noble et al. | | |
| 3,984,980 A | 10/1976 | Wise | | |
| 4,258,677 A | 3/1981 | Sanders | | |
| 4,421,661 A | 12/1983 | Claar et al. | | |
| 4,497,305 A | 2/1985 | Ozawa | | |
| 4,503,838 A | 3/1985 | Arrhenius et al. | | |
| 4,657,067 A | 4/1987 | Rapp et al. | | |
| 5,085,790 A | 2/1992 | Hormansdorfer | | |
| 5,323,842 A | 6/1994 | Spokoyny et al. | | |
| 5,348,080 A | 9/1994 | Kuroda et al. | | |
| 5,465,585 A * | 11/1995 | Mornhed et al. | | 165/10 |
| 5,525,250 A | 6/1996 | Hammond | | |
| 5,525,251 A | 6/1996 | Hammond | | |
| 5,551,384 A | 9/1996 | Hollis | | |
| 5,591,374 A | 1/1997 | Kniep et al. | | |
| 5,613,578 A | 3/1997 | Moseley et al. | | |
| 5,728,316 A | 3/1998 | Kniep et al. | | |
| 5,785,884 A | 7/1998 | Hammond | | |
| 6,083,418 A | 7/2000 | Czarnecki et al. | | |
| 6,627,106 B1 | 9/2003 | Lotz et al. | | |
| 6,784,356 B1 | 8/2004 | Czarnecki et al. | | |
| 7,096,925 B2 | 8/2006 | Bracciano | | |
| 7,144,557 B2 | 12/2006 | Yada et al. | | |
| 7,297,814 B2 | 11/2007 | Yada et al. | | |
| 7,514,419 B2 * | 4/2009 | Erion et al. | | 514/140 |
| 7,829,552 B2 * | 11/2010 | Erion et al. | | 514/140 |
| 7,967,999 B2 * | 6/2011 | Tomura | | 165/10 |
| 8,016,022 B2 * | 9/2011 | Richason et al. | | 165/10 |
| 2004/0115113 A1 | 6/2004 | Ohrem | | |
| 2004/0194908 A1 | 10/2004 | Tomohide | | |
| 2005/0247906 A1 | 11/2005 | Neuschutz et al. | | |
| 2006/0101997 A1 | 5/2006 | Py et al. | | |
| 2008/0289793 A1 * | 11/2008 | Geiken et al. | | 165/10 |
| 2009/0199994 A1 * | 8/2009 | Amano | | 165/10 |
| 2009/0250189 A1 | 10/2009 | Soukhojak | | |
| 2010/0133464 A1 * | 6/2010 | Tomura | | 252/70 |
| 2010/0147486 A1 | 6/2010 | Vetrovec | | |
| 2011/0067426 A1 * | 3/2011 | Hwang et al. | | 165/10 |
| 2011/0259544 A1 * | 10/2011 | Neti et al. | | 165/10 |

FOREIGN PATENT DOCUMENTS

| | | |
|---|---|---|
| DE | 1208730 B | 1/1966 |
| DE | 2639173 A1 | 3/1978 |
| DE | 32 45 027 A1 | 6/1984 |
| DE | 3929900 A1 | 3/1991 |
| DE | 90 15 510 U1 | 3/1992 |
| DE | 41 33 360 A1 | 4/1992 |
| DE | 20 2005 017832 U1 | 1/2006 |
| DE | 20 2005 015393 U1 | 10/2006 |
| EP | 0049761 A1 | 4/1982 |
| EP | 0105059 A1 | 4/1984 |
| EP | 0139829 A1 | 5/1985 |
| EP | 0142028 A1 | 5/1985 |
| EP | 13 613 42 A1 | 11/2003 |
| EP | 1972675 A2 | 9/2008 |
| FR | 1417527 A | 11/1965 |
| GB | 2125156 A | 2/1984 |
| JP | 51126980 A | 11/1976 |
| JP | 2005/076454 A | 3/2005 |
| WO | 79/01004 A1 | 11/1979 |
| WO | 89/09249 A1 | 10/1989 |
| WO | 93/12193 A1 | 6/1993 |
| WO | 96/23848 A2 | 8/1996 |
| WO | 01/92129 A | 12/2001 |
| WO | 2008/050210 A | 5/2008 |
| WO | 2008/071205 A1 | 6/2008 |
| WO | 2009/053245 A1 | 4/2009 |

OTHER PUBLICATIONS

"LiBr-LiNO3" Data from FTsalt FACT salt databases, available at, http://www.crct.polymtl.ca/fact/documentation/FTsalt/LiBr-LiNO3.jpg.

"LiCl-LiNO3" Data from FTsalt FACT salt databases, available at, http://www.crct.polymtl.ca/fact/phase_diagram.php?file=LiCl-LiNO3.jpg&dir=FTsalt.

"LiNO3-NaNO3" Data from FTsalt FACT salt databases, available at, http://www.crct.polymtl.ca/fact/phase_diagram.php?file=LiNO3-NaNO3.jpg&dir=FTsalt.

Andreas Hauer, "Innovative Thermal Energy Storage Systems for Residential Use", Bavarian Center for Applied Energy Research, ZAE, Bayern. Available at: http://mail.mtprog.com/CD_Layout/Poster_Session/ID188_Hauer_final.pdf.

A.N. Campbell and E.T. Van Der Kouwe, "Studies on the thermodynamics and conductances of molten salts and their mixtures. Part VI. Calorimetric studies of sodium chlorate and its mixtures with sodium nitrate" Canadian Journal of Chemistry, 46, 1287-1291 (1968).

Bauer et al., "PCM-Graphite Composites For High Temperature Thermal Energy Storage," Proceedings of the 10$^{th}$ International Conference on Themal Energy Storage, New Jersey (2006).

Birchenall and Riechman, "Heat storage in eutectic alloys," Metallurgical and Materials Transactions A, 1415-1420 11(8) (1980).

Buschle et al., *Analysis of steam storage systems using Modelica*, (Sep. 4-5, 2006) (German Aerospace Center (DLR), Institute of Technical Thermodynamics, Stuttgart, Germany), The Modelica Association 235-242 (2006). Available at: http://www.modelica.org/events/modelica2006/Proceedings/sessions/Session3a1.pdf.

Colvin et al. "Twenty Years of Encapsulated PCM Development in the United States: Coolants, Composites, Powders, Coatings, Foams, Fibers, and Apparel." Triangle Research and Development Corporation.

Co-pending PCT Application No. PCT/US2009/034647 filed Feb. 20, 2009, Published as WO 2009/148640 on Dec. 10, 2009.

Dincer et al., "Thermal Energy Storage Methods", *Thermal Energy Systems and Applications*, 93-212, John Wiley & Sons, London (2002).

Edie News, "Heat 'Batteries' Dramatically Cut Energy Use, GreenBiz.com," May 26, 2006. Available at: http://www.greenbiz.com/news/2006/05/26/heat-batteries-dramatically-cut-energy-use.

H. Mehling and S. Hiebler, "Review on PCM in buildings—current R&D," (Jul. 7-9, 2004) (6th Workshop IEA Annex 17 'Advanced Thermal Energy Storage through Application of Phase Change Materials and Chemical Reactions—Feasibility Studies and Demonstration Projects', Arvika, Sweden). Available at: http://www.fskab.com/annex17/Workshops/EM6%20Arvika/Presentations/Annex17%20Harald%20Mehling.pdf.

Janz et al., "Melting and Pre-Melting Phenomena in Alkali Metal Nitrates," J. Chem. Eng. Data, 133-136, 9(1) (1964).

Juhani Laurikko, "On exhaust emissions from petrol-fuelled passenger cars at low ambient temperatures," (May 23, 1998) (Ph.D. dissertation, Helsinki University of Technology) 348 Valtion teknillinen tutkimuskeskus 48-50 (1998).

Kamimoto et al., "Investigation of Nitrate Salts for Solar Latent Heat Storage," Solar Energy, 581-587, 24 (1980).

Kerslake et al., "Analysis of Thermal Energy Storage Material with Change-of-phase volumetric effects," NASA Technical Memorandum 102457, (Feb. 1990). (Also in Journal of Solar Engineering, 22-31, 115(1) (1993), Abstract Only.).

Kim, et al., "A study of storage media for heat storage systems for a vehicle," Journal of Korean Ind. & Eng. Chemistry, 726-734, 7(4) (1996). Abstract Only.

P.I. Protsenko, R.P. Shisholina, "System from lithium and potassium nitrites and nitrates," Zhurnal Neorganicheskoi Khimii, 2744-2747, 8(12) (1963). Abstract Only.

Peng et al., "High-temperature thermal stability of molten salt materials," International Journal of Energy Research, 1164-1174, 32 (2008).

Sanders et al., "Engine Heating Device. Final Report." Sponsor: Department of Energy, Washington, D.C. (0858860000 9520250).

Schatz, "Cold Start Improvement by use of Latent Heat Stores," SAE 921605, Aug. 1, 1992.

Sharma and Sangara "Latent Heat Storage Materials and Systems a Review," International Journal of Green Energy, 1-56, 2 (2005).

R.P. Shisholina, P.I. Protsenko, "The System Li, Na || NO$_2$, NO$_3$," Zhurnal Neorganicheskoi Khimii, 2741-2743, 8(12) (1963). Abstract Only.

Takahashi et al., "Heat capacities and latent heats of $LiNO_3$, $NaNO_3$, and $KNO_3$," International Journal of Thermophysics, 1081-1090, 9(6) (1988).

Tamme et al., "Latent heat storage above 120° C for application in the industrial process heat sector and solar power generation," International Journal of Energy Research, 264-271, 32 (2008).

Yuvaraj et al., "Thermal Decomposition of Metal Nitrates in Air and Hydrogen Environments," J. Phys. Chem. B., 1044-1047, 107 (2003).

PCT International Preliminary Report on Patentability from the International Bureau, PCT/US2009/034647, mailed Oct. 28, 2010.

Buschle, J. et al., Analysis of steam storage systmes using Modelica, Modelica, Sep. 4-5, 2006, pp. 235-242.

Hitec Heat Transfer Salt, Brenntag, Coastal Chemical Co., pp. 1-10.

Hitec Solar Salt, Coastal Chemical Co. L.L.C, Houston, TX, 3 pages.

Bauer, T., Sodium Nitrate for High Temperature Latent Heat Storage, The 11th International Conference on Thermal Energy Storage—Effstock, 14-17, Jun. 2009 in Stockholm, Sweden.

Laing, D., Advanced High Temperature Latent Heat Storage System—Design and Test Results, Institute of Technical Thermodynamics, German Aerospace Center, Pfaffenwaldring 38-40.

Bauer, Thomas, PCM-Graphite Composites for High Temperature Thermal Energy Storage, The Tenth International Conference on Thermal Energy Storage, Atlantic City, May 31-Jun. 2, 2006.

* cited by examiner

THERMAL ENERGY STORAGE MATERIALS

CLAIM OF PRIORITY

The present application claims the benefit of the filing dates of U.S. Provisional Patent Application Nos. 61/030,755 (filed Feb. 22, 2008); 61/061,908 (filed Jun. 16, 2008); 61/074,799 (filed Jun. 23, 2008); 61/074,840 (filed Jun. 23, 2008); 61/074,869 (filed Jun. 23, 2008); 61/074,889 (filed Jun. 23, 2008); and 61/090,084 (filed Aug. 19, 2008), and U.S. patent application Ser. No. 12/389,598 entitled "HEAT STORAGE DEVICES" filed on Feb. 20, 2009, the contents of which are hereby incorporated by reference in their entirety.

FIELD OF THE INVENTION

The present invention relates to thermal energy storage materials (TESMs), and in one particular aspect, to improved TESM chemical compositions.

BACKGROUND OF THE INVENTION

Thermal energy storage materials (TESMs) are known and have been used in applications for storing heat for subsequent use. Many TESMs are phase change materials, meaning they undergo a phase change, typically between solid state and liquid state, and can store (or release) a considerable amount of the heat, regarded as latent heat from the phase change. Many of these phase change materials include mixtures of compounds, such that the mixture has a lower liquidus temperature than the pure compounds or elements used in the mixture. See generally, Chapter 3, I. Dincer and M. A. Rosen, *Thermal Energy Storage Systems and Applications*, John Wiley & Sons, London, 2002.

Attention has been directed toward TESMs for use at temperatures below about 85° C. Much of this body of work utilizes mixtures of hydrous metal salts. For example, U.S. Pat. No. 6,627,106 discloses various phase change materials comprising ternary mixtures of magnesium nitrate hexahydrate with other metal nitrates. These mixtures having phase changes from about 52° C. to about 69° C., depending on the metal nitrates being combined and on the concentration of each metal salt. U.S. Pat. No. 5,785,884 discloses similar ternary mixtures of magnesium nitrate hexahydrate with sodium nitrate and potassium nitrate. These hydrous mixtures of metal nitrates have solid to liquid phase transitions between 60° C. and 85° C. U.S. Pat. No. 5,728,316 describes binary mixtures of magnesium nitrate hexahydrate and lithium nitrate where the molar ratio of magnesium nitrate hexahydrate to lithium nitrate is from 86:14 to 81:19 with single melting temperature in the range of 71° C. to 78° C. U.S. Pat. No. 6,083,418 discloses phase change materials comprising a mixture of two metal nitrates (an alkali metal nitrate and an alkaline earth metal nitrate) with an excess of water, such that the phase change material has a small change in density between the solid phase and the liquid phase. The water concentration ranges from 27.9% to 37.2% by weight of the phase change material, with the specific concentration range of the water dependent on the metal salts being mixed. U.S. Pat. No. 5,348,080 shows mixtures of water, sodium nitrate, and potassium nitrate and describes phase change materials having a solid to liquid transition temperature below 0° C. See also, U.S. Pat. No. 5,591,374.

Attention also has been directed toward anhydrous mixtures of metal salts as phase change materials having very high phase transition temperatures. For example, Kerslake, T. W. and M. B. Ibrahim, "Analysis of thermal energy storage material with change-of-phase volumetric effects," Journal of Solar Engineering, 115:1, (1993) pp. 22-31, disclose anhydrous mixtures of lithium fluoride and calcium fluoride which melt at 1,040 K (767° C.). U.S. Pat. No. 4,657,067 discloses a variety of binary and ternary metal compositions which can be used as thermal energy storage materials. These mixtures all have melting or liquidus temperatures above 500° C. Other phase change materials for use in various applications are disclosed in U.S. Pat. Nos. 4,421,661 and 5,613,578. In a paper presented to The Modelica Association, entitled "Analysis of steam storage systems using Modelica" (Modelica 2006, September 4-5), Buschle, et al attempt to model steam storage systems that use unspecified eutectic mixtures of "salts such as: lithium nitrate ($LiNO_3$), lithium chloride (LiCl), potassium nitrate ($KNO_3$), potassium nitrite ($KNO_2$), sodium nitrate ($NaNO_3$), sodium nitrite ($NaNO_2$) and calcium nitrate ($Ca(NO_3)_2$)."

Heretofore, efforts to apply TESMs in commercial applications have also been complicated by difficulties in achieving satisfactory performance in service. Though a TESM may be known to have certain attributes to qualify it as a heat storage material, the assembly of such TESMs into a functionally operative system has been complicated by the unpredictability of the materials and other considerations, such as TESM interactions in service with other system materials. For example, corrosion resistance has proven to be a complicating factor for some systems. Many materials known to be phase change materials are also corrosive in many environments. It may also prove difficult to predict how mixtures of such materials will fare in a desired application. Consider also that, typically, the TESMs must be packaged in some device that affords efficient heat exchange. Considerations such as the compatibility of TESMs with these devices potentially can significantly deteriorate the performance of a particular TESM, even though the TESM is regarded theoretically as a good performing TESM. For example, some water-containing TESMs have been observed to cause relatively rapid corrosion of device packaging. Unpredictable kinetics also have complicated the adaptation of various TESM material systems, as has been durability in the face of intensive thermal cycling.

In view of the above, there continues to be a need for new and efficient TESMs specifically for use at one or more temperatures of about 85° C. to 300° C. and exhibiting one or more of a relatively high energy storage density, a relatively high heat of fusion, relatively low corrosivity toward common materials of construction, relatively rapid crystallization kinetics, long cycle life and long calendar life, and otherwise good compatibility with components of systems in which the TESMs are used.

SUMMARY OF THE INVENTION

The present invention meets some or all of the above needs by providing an improved TESM system that reliably and reproducibly stores and recovers latent heat comprising: a container having a wall surface; and a TESM in at least partial contact with the wall surface, and including: i) at least one first metal containing material including at least one first metal compound that includes a nitrate ion, a nitrite ion, or both; ii) at least one second metal containing material including at least one second metal compound; and iii) optionally including water, wherein the water concentration if any is present is less than about 10 wt. %; wherein the TESM has a liquidus temperature, $T_L$, from about 100° C. to about 250° C.; and wherein the TESM exhibits a heat storage density from 300° C. to 80° C. of at least about 1 MJ/l; so that upon being used in a system that generates heat, at least a portion of the heat is captured and stored by the TESM and subsequently released for use, and wherein the absolute value of the change in mass of the wall surface in contact with the TESM is less than about 1 g per m² of the wall surface after 45 days exposure to the TESM at 300° C. in an inert atmosphere.

The TESM system may include a TESM according to the present teachings in a container (e.g., a capsule), optionally being substantially free of any water and/or hydrogen in some other form, which has an interior wall including a metal oxide that has substantially no thermodynamic reaction with the TESM in service conditions. One particularly preferred TESM includes two metal containing compounds, each including a cation selected from lithium or sodium, and an anion selected from nitrate or nitrite. The TESM may include one or more other agents that improve its performance, such as a thermal conductivity promoter, a corrosion inhibitor, a nucleator, or any combination thereof. The TESMs exhibit any of a number of other attractive characteristics. For example, the TESM may have a value of $H_{c50}/H_{C1}$ greater than 70%, where $H_{c50}$ is defined as the quenched heat of crystallization measured by differential scanning calorimetry at a cooling rate of about 50° C./min over a temperature range of $T_L+50°$ C. to $T_L-100°$ C. and $H_{C1}$ is defined as the slow cooled heat of crystallization measured by differential scanning calorimetry at a cooling rate of about 1° C./min. The TESM may have a liquidus temperature which is less than $T_{min}-25°$ C., wherein $T_{min}$ is the lowest melting temperature of any binary salt which can be formed by any anion of the TESM and any cation of the TESM. Other beneficial aspects will be gleaned from the teachings that follow.

DETAILED DESCRIPTION OF THE INVENTION

Figure 1:
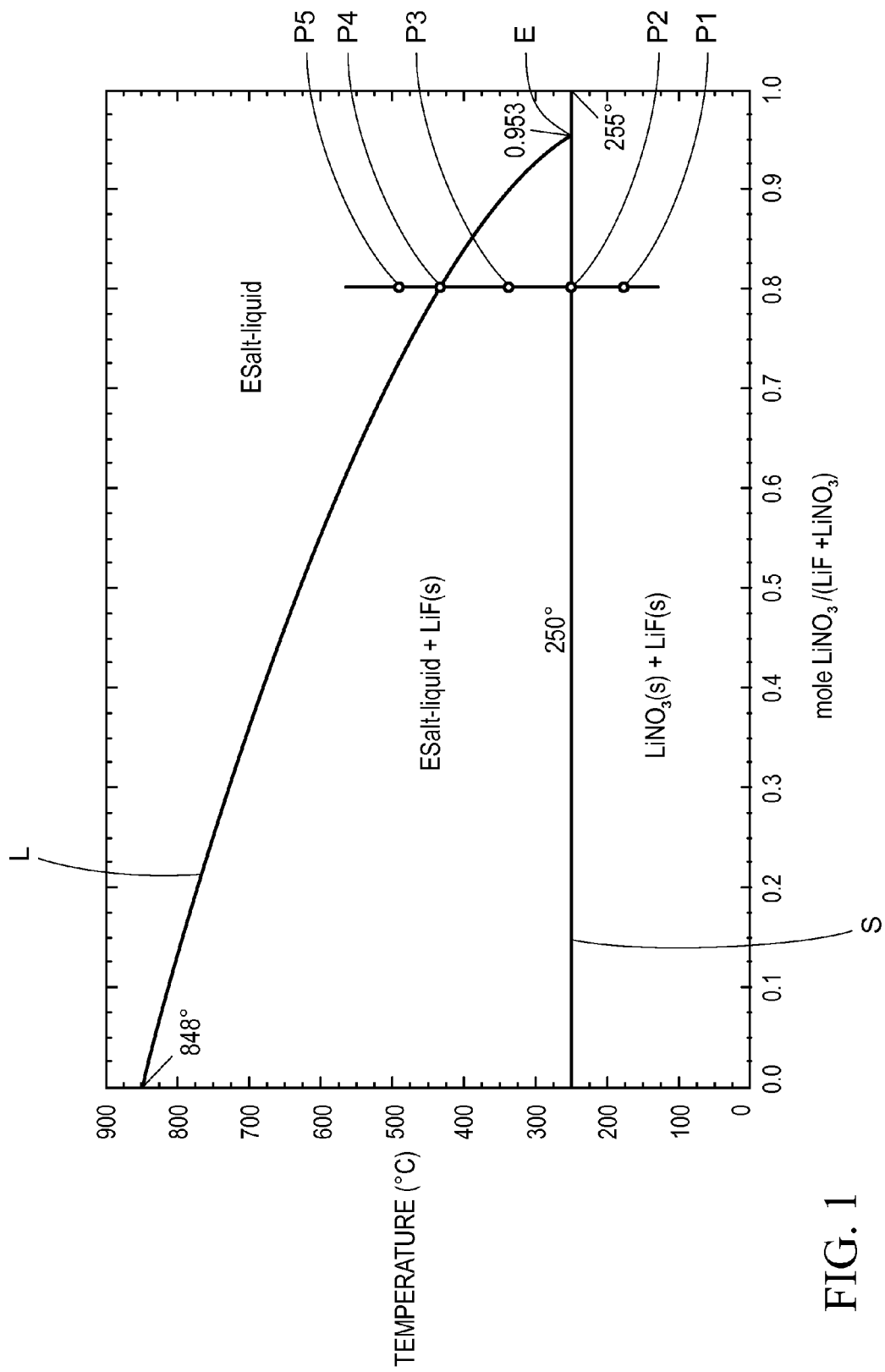
FIG. 1 is a calculated phase diagram of a lithium fluoride and lithium nitrate system.

The teachings herein pertain generally to thermal energy storage materials (TESMs). As will be illustrated, the TESMs offer a number of valuable attributes that render them useful in various applications in which it is desired to store heat, and later to release the heat after a lapse of some amount of time. To facilitate the storage of heat, the present TESMs will preferably be phase change materials, in that they undergo at least one phase change at a temperature below their maximum operating storage temperature for a given application. Such a phase change can be a solid-solid phase change, a solid-liquid phase change, or a liquid-gas phase change. One preferred phase change is a solid-liquid phase change, pursuant to which energy equal to the latent heat of fusion is required to melt the material.

Reference herein will be made to solidus temperatures ($T_S$) and liquidus temperatures ($T_L$). The solidus temperature is the temperature below which a given material, at thermodynamic equilibrium, is completely solid. The liquidus temperature, as used herein, is the temperature above which a given material, at thermodynamic equilibrium, is completely liquid. For some materials (e.g. certain pure metals and eutectic compositions at their eutectic point), the liquidus and solidus temperature are one and the same, and are referred to generally as the melting temperature (or the eutectic temperature ($T_e$)). Such temperature is, theoretically, the temperature above which the material is liquid and below which the material is solid. As used herein, melting temperatures, liquidus temperatures or solidus temperatures (unless expressed otherwise) are at approximately one (1) atmosphere pressure.

Metal containing compounds which are mixtures of metals or mixtures of metal salts may have a eutectic composition. When the mixture has a composition which is not at a eutectic composition, it will typically undergo a phase transition over a range of temperatures. For example, the mixture may start to melt at the solidus temperature, $T_s$ which may be the eutectic temperature. As the temperature increases, the mixture will continue to melt until it reaches the liquidus temperature, $T_L$. Above the liquidus temperature the mixture is completely in the liquid (molten) state.

It is known in the art that the solidus and liquidus temperatures can be determined by measurements using differential scanning calorimetry. For example, the present teachings contemplate that they are determined by differential scanning calorimetry by heating a 3.0-4.0 mg sample from room temperature at a rate of about 10° C./min. For example, these values can be realized by use of a differential scanning calorimeter (e.g., a Q2000 differential scanning calorimeter (TA Instruments, New Castle, Del.)) at a scanning rate of about 10° C./minute, heated to a temperature beyond which no liquid remains in the sample (e.g., to about 400° C.), and plotting heat flux against temperature, establishing a base line value, and identifying deviations from the baseline. As temperature is increased, the start of the deviation corresponds with the solidus, and the end of the deviation corresponds with the liquidus.

A calculated equilibrium phase diagram (at 1 atm) of lithium fluoride and lithium nitrate (given in FIG. 1) can be used to illustrate these concepts. The solidus line for this composition, shown by line S, is a horizontal line and gives the predicted solidus temperature. One of the liquidus lines is shown by line L. This liquidus line corresponds to the concentration dependent liquidus temperature of the compositions containing less than about 95.3 mole % lithium nitrate. Lithium fluoride and lithium nitrate are seen to have a eutectic composition, shown by point E, of about 95.3 mole % lithium nitrate and about 4.7 mole % lithium fluoride, with a eutectic temperature of about 250° C., which is below the melting temperature of either pure lithium nitrate or pure lithium fluoride. When material having the eutectic composition is heated from room temperature, it will start as a solid phase and undergo a phase transition at about 250° C. where the material will completely melt at that temperature. This theoretical phase diagram can be further understood by points P1, P2, P3, P4, and P5, which all correspond to a composition of about 80 mole % lithium nitrate. Point P1 is located below the solidus line and shows a condition where, at equilibrium, the material is expected to exist only in the solid state. Point P2 is on the solidus line. Point P3 is between the solidus line and the liquidus line and shows a condition where, at equilibrium, the material is expected to have both a liquid phase and a solid phase. Point P4 is on the liquidus line. Point P5 is above the liquidus line and shows a condition where, at equilibrium, the material is expected to exist only in the liquid phase.

Figure 2:
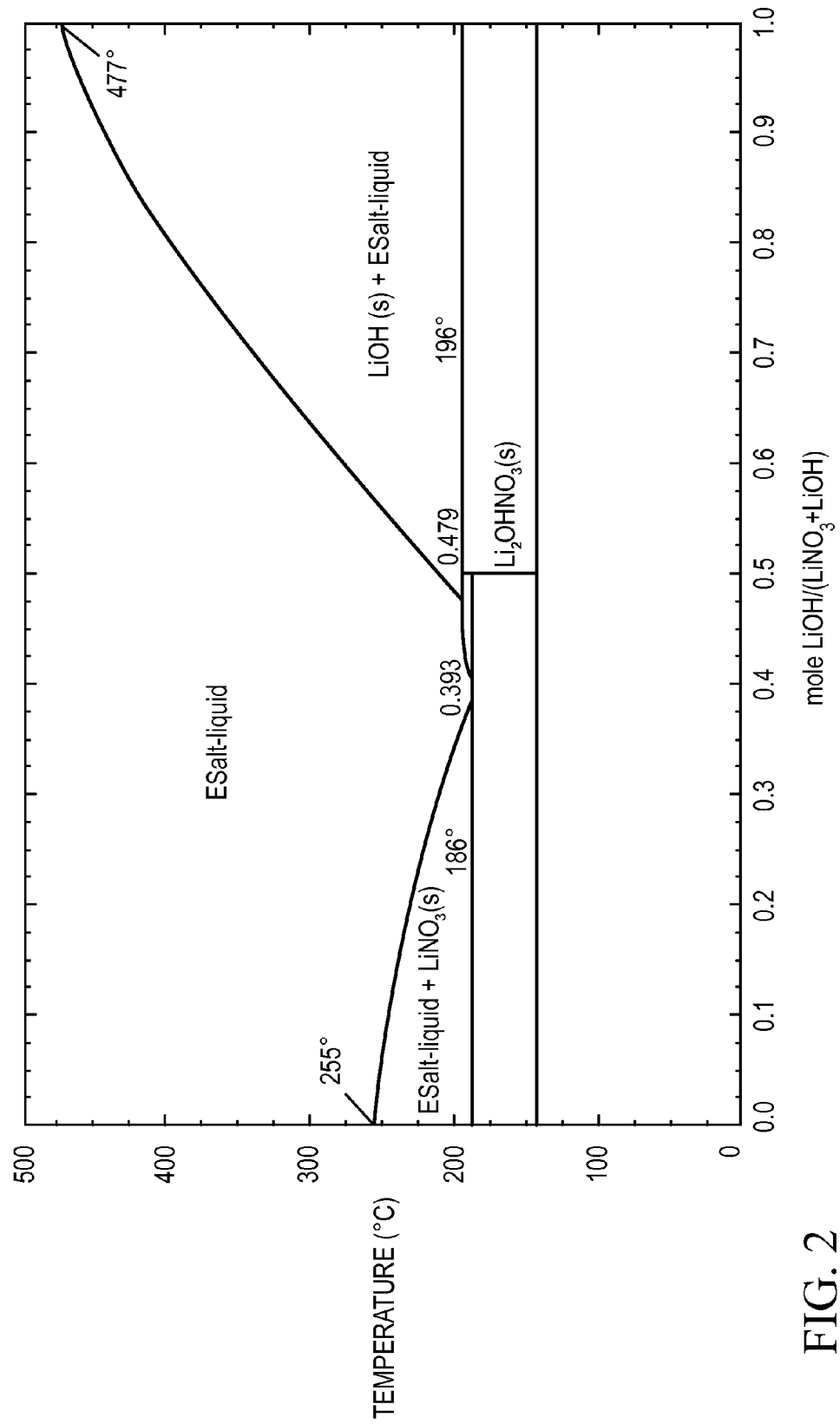
FIG. 2 is an expected experimental phase diagram of a lithium nitrate and lithium hydroxide system.

A calculated phase diagram of lithium nitrate and lithium hydroxide (given in FIG. 2) further illustrates these concepts. These salts have a eutectic composition of about 0.393 mole fraction lithium hydroxide, and a eutectic temperature of about 186° C. which is more than 50° C. lower than the melting temperature of pure lithium nitrate. As illustrated a mixture of salts may have a large range of compositions which have a liquidus temperature lower than (e.g., at least 25° C., or even at least 50° C.) one or all of the pure salts in the mixture.

As will be seen the present invention contemplates that the TESM include (or may even consist essentially of or consist of) at least one first metal containing material, and more preferably a combination of the at least one first metal containing material and at least one second metal containing material. The first metal containing material, the second metal containing material, or both, may be a substantially pure metal, an alloy such as one including a substantially pure metal and one or more additional alloying ingredients (e.g., one or more other metals), an intermetallic, a metal compound (e.g., a salt, an oxide or otherwise), or any combination thereof. One preferred approach is to employ one or more metal containing materials as part of a metal compound; a more preferred approach is to employ a mixture of at least two metal compounds. By way of example, a suitable metal compound may be selected from oxides, hydroxides, compounds including nitrogen and oxygen (e.g., nitrates, nitrites or both), halides, or any combination thereof. One particularly preferred metal compound includes at least one nitrate compound, at least one nitrite compound or a combination thereof. Preferred TESMs for use herein thus may be part of a binary component material system, pursuant to which two discrete compounds are combined with each other (e.g., a first metal nitrate or nitrite combined with second metal nitrate or nitrite). It is possible that ternary, quaternary or other multiple component material systems may be employed also. The TESMs herein may be mixtures of two or more materials that exhibit a eutectic.

The metals for use herein may be any suitable metal capable of being used in a material system that has a liquidus temperature from about 85° C. to about 350° C. Examples of suitable metals may be selected from tin, lead, zinc, magnesium, aluminum, lithium, sodium, potassium, beryllium, calcium, gallium, indium, thallium, strontium, barium, rubidium, francium, bismuth, cadmium, antimony, tellurium, or any combination thereof. Still more preferred metals are selected from sodium, potassium, lithium, magnesium, or any combination thereof. Even still more preferred metals are sodium, lithium, potassium, or any combination thereof. Most preferred are sodium, lithium or a combination thereof. It will be appreciated from the above, that certain of the mentioned metals have melting points outside of the range of about 85° C. to about 350° C.; such a metal is contemplated to be employed other than in its pure form.

The liquidus temperature of the TESMs may be low relative to the melting temperatures of the individual components in the TESMs. As such, the TESMs may have a liquidus temperature less than about $T_{min}-25°$ C., where $T_{min}$ is the lowest melting temperature of any salt (e.g., a binary compound salt) which can be formed by a significant anion (e.g., an anion present at a concentration of at least about 3 mole %, based on the total moles of anions in the TESM) and a significant cation (e.g., a cation present at a concentration of at least about 3 mole %, based on the total moles of cations in the TESM) of the TESMs. The TESMs may have a liquidus temperature which more preferably is less than about $T_{min}-40°$ C., and most preferably is less than about $T_{min}-50°$ C. The liquidus temperature of the TESMs may also be characterized in relation to the minimum liquidus temperature of all the composition comprising the anions and cations (e.g., comprising the significant anions and cations) in the TESMs, $T_{liquidus,min}$. In certain mixtures, $T_{liquidus,min}$ may be the eutectic temperature. The TESMs may have a liquidus temperature less than about $T_{liquidus,min}+50°$ C., more preferably less than about $T_{liquidus,min}+25°$ C., and most preferably less than about $T_{liquidus,min}+10°$ C.

Thermal energy storage materials which are useful for the present invention may have a liquidus temperature from about 85° C. to about 350° C., such as about 95° C. to about 300° C. (e.g., from about 100° C. to about 200° C.). The liquidus temperature is preferably less than about 350° C., more preferably less than about 310° C. (e.g. less than about 300° C., or even 270° C.). Thermal energy storage materials having a liquidus temperature less than about 250° C. are also contemplated. The liquidus temperature is preferably greater than about 95° C., more preferably greater than about 100° C. (e.g. greater than about 125° C., or even 175° C.). Higher liquidus temperatures may be possible also (e.g., to about 700° C.).

To achieve this, it may be possible to employ one or more materials that have a liquidus temperature that exceeds about 200° C. One or more of the metal containing materials may have a liquidus temperature less than about 450° C. and, more preferably, less than about 400° C., or even less than about 350° C. It is possible that a composition herein may include at least a first metal compound and a second metal compound. At least one of the compounds (e.g., the first metal compound) may have a liquidus temperature, $T_L$ less than about 450° C. and more preferably, less than about 400° C., still more preferably less than about 350° C. (e.g. less than about 310° C.). The first metal compound may also have a liquidus temperature higher than about 85° C., and more preferably, higher than about 90° C., still more preferably higher than about 100° C., (e.g. higher than about 125° C., or even 175° C.).

For systems that include two or more metal containing compounds, one of the metal containing compounds (e.g., the second) preferably has a liquidus temperature higher than the liquidus temperature of the other (e.g., the first) metal containing compound. One (e.g., the second) metal containing compound may have a larger entropy of fusion density than the other (e.g., the first) metal containing compound. By way of example, the second metal containing compound may have a liquidus temperature, $T_L$, greater than about 310° C. and more preferably, greater than about 400° C., (e.g. greater than about 440° C.).

If the TESM is a mixture that is not at its eutectic composition (e.g., it is a binary composition that may have a eutectic, but it is not used at its eutectic composition), the difference between the liquidus temperature and the solidus temperature is preferably less than about 150° C., more preferably less than about 100° C., and most preferably less than about 50° C. By way of example, without limitation, solidus temperatures may range from about 85° C. to about 350° C. The solidus temperature may be less than about 300° C., more preferably less than about 270° C. (e.g. less than about 250° C.). The solidus temperature may be greater than about 100° C., more preferably greater than about 125° C. (e.g. greater than about 175° C.). For example, the solidus temperature may be from about 100° C. to about 300° C.

Preferably, the TESMs systems employing them herein will be essentially free of water, whether chemical water (e.g., chemically bound water), physical water (e.g., physically bound water) or both (i.e., it will be substantially anhydrous). Thus, the TESM or system that employs the TESM may have a concentration of water, measured for example by Karl Fischer titration (e.g., using a Sartorius WDS 400) less than about 5000 ppm, 2500 ppm, 1000 ppm, 500 ppm, 400 ppm, 350 ppm, 250 ppm, 100 ppm, 50 ppm, 25 ppm, 10 ppm, or even below the detection limit of typical Karl Fisher titration techniques using a sample size of about 1 gram.

It is possible, however, that some water optionally may be employed in TESMs of the present invention, such as water as a result of hydration of a metal salt, by the addition of water as a diluent, or otherwise. For example, water may be present in an amount less than about 10 percent by weight of the total material in the thermal energy storage material system, more preferably less than about 5 percent by weight of the total material in the thermal energy storage material system, and still more preferably less than about 2 percent by weight of the total material in the thermal energy storage material system, and even still more preferably less than about 1 percent by weight of the total material in the thermal energy storage material system (e.g., less than about 0.5 percent by weight of the total material in the thermal energy storage material system).

TESMs herein will exhibit attractive performance characteristics that allow it to store large quantities in a given volume of material. Such a material thus may be characterized as having a relatively high "latent heat of fusion density", which is also referred to as "heat of fusion density". The latent heat of fusion density, which is the product of the latent heat of fusion (MJ/kg) (measured using differential scanning calorimetry, e.g., using a TA Instruments DSC Q2000 calibrated for heat capacity with a sample size of about 10 mg and a cooling rate of about 10° C./min, and determined by integrating the maxima of the plot of heat flow against temperature) and the density at 25° C. (kg/l) (and which reflects a value associated with the release of heat during a phase transition from a liquid to a solid state), may be greater than about 0.35 MJ/l; preferably greater than about 0.45 MJ/l, more preferably greater than about 0.65 MJ/l, more preferably greater than about 0.8 MJ/l, more preferably greater than about 1 MJ/l, still preferably greater than about 1.2 MJ/l, even still more preferably greater than about 1.4 MJ/l and most preferably greater than about 1.6 MJ/l (e.g., greater than about 2.0 MJ/l).

Figure 3:
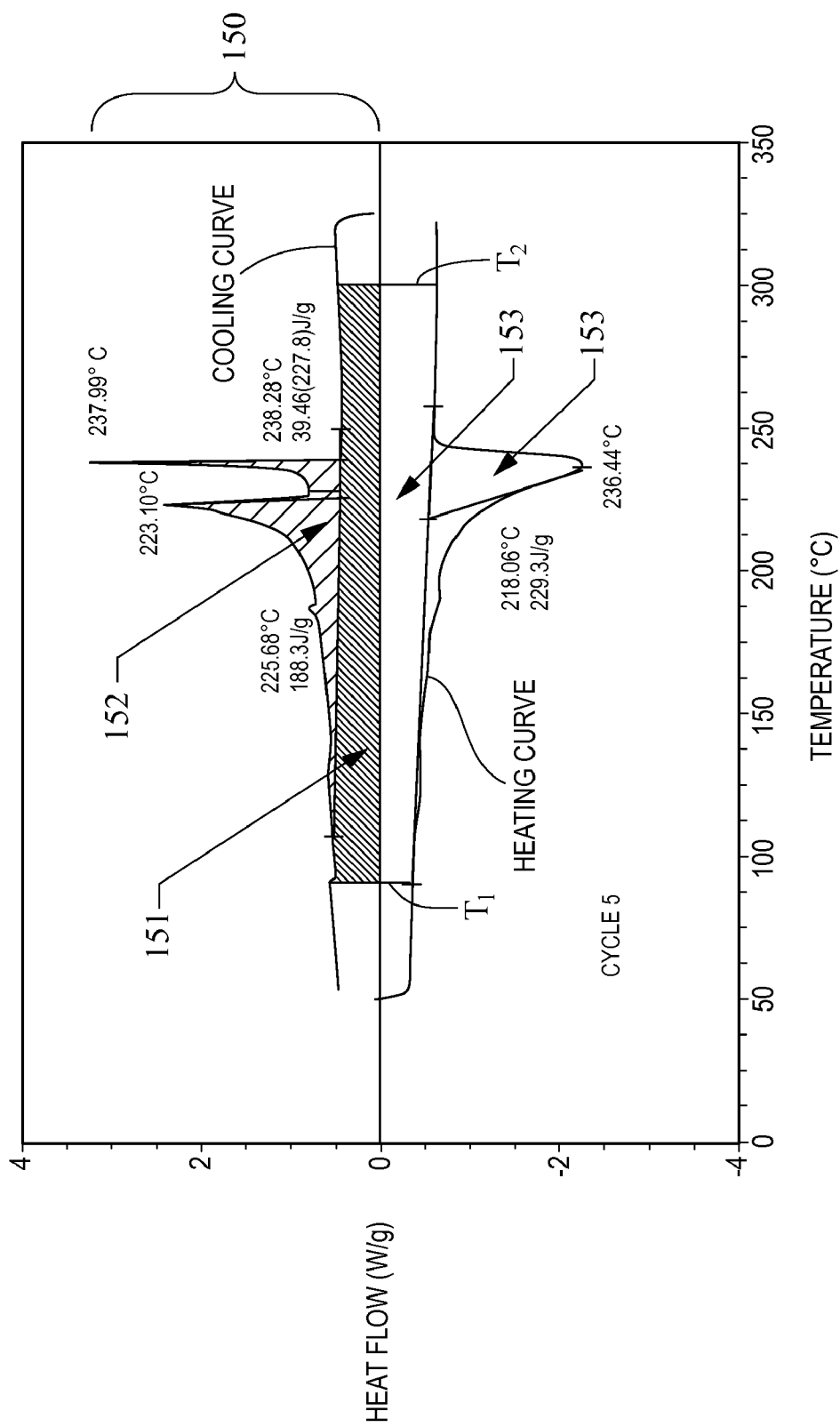
FIG. 3 illustrates output of a test for measuring the heat storage density from 300° C. to 80° C. and the cumulative heat density from 80° C. to 300° C.

Another measure of the capacity to store thermal energy may be the "heat storage density" ($HSD_{T2,T1}$) given by the amount of the heat released from 1 liter (at 25° C. and 1 atmosphere pressure) of a thermal energy storage material as it is cooled from a high temperature $T_2$ to a low temperature $T_1$ (where $T_2$ and $T_1$ are both in ° C.). The $HSD_{T2,T1}$ may be measured by differential scanning calorimetry calibrated for heat capacity at a constant heating rate of about 10° C./min and a constant cooling rate of about $-10°$ C. as illustrated in FIG. 3. More specifically, the heat storage density ($HSD_{T2,T1}$) of the thermal energy storage material may be determined by first measuring the room temperature (23° C.) density of the material in units of kilograms per liter (kg/l). Next, a 3.0-4.0 mg sample of the thermal energy storage material is heated at 10° C./min from room temperature to $T_2+50°$ C. in a Q2000 differential scanning calorimeter (TA Instruments, New Castle, Del.). The sample is then cooled at 10° C./min back to room temperature. The energy released per kg of the thermal energy storage material, when the material is cooled from $T_2$ to $T_1$ is measured by the differential scanning calorimeter in units of J/kg. The heat storage density ($HSD_{T2,T1}$), in units of J/l, is then calculated by multiplying the density by the energy released upon cooling the material.

Figure 4:
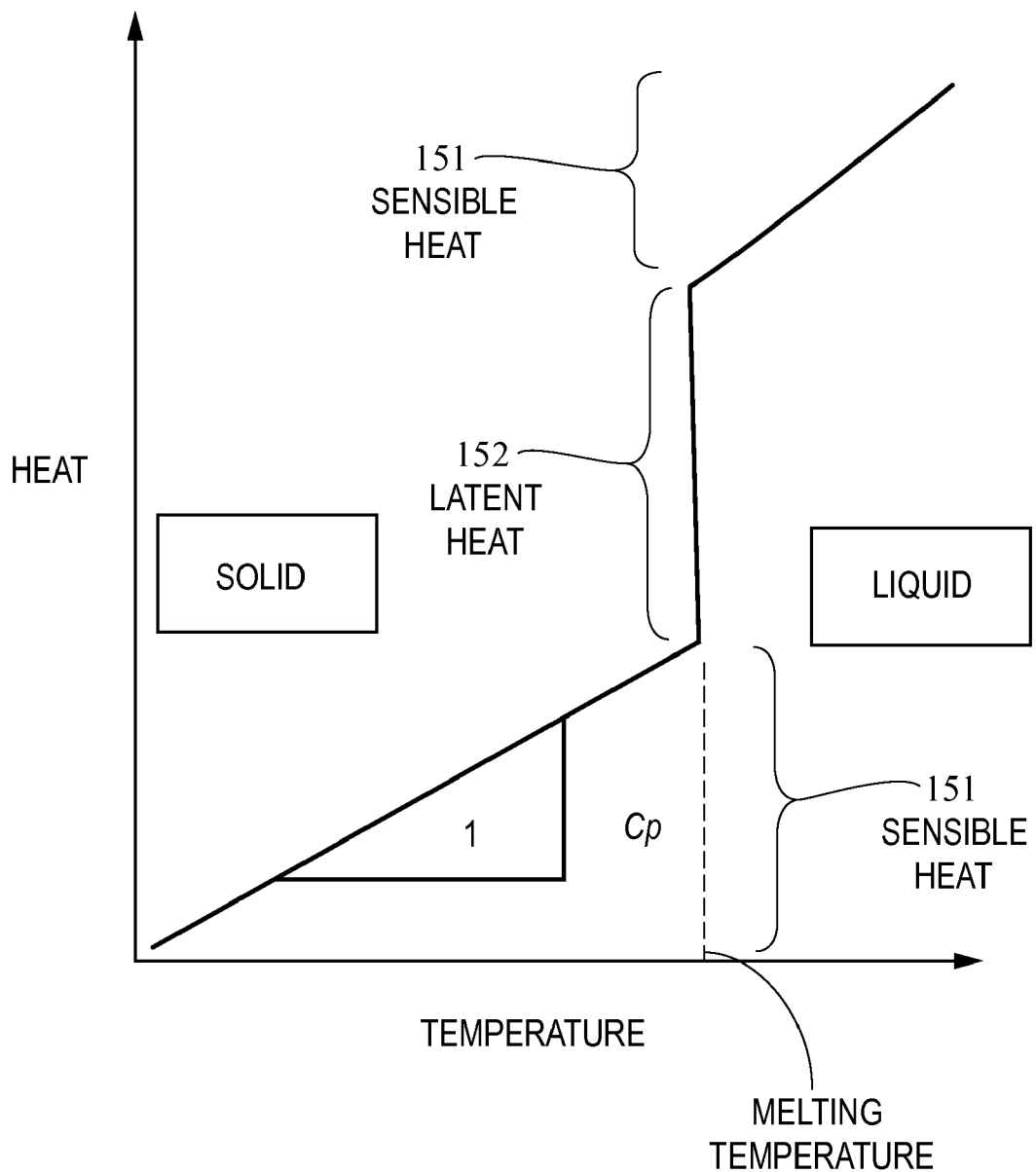
FIG. 4 illustrates the concepts of sensible and latent heat of a TESM.

As seen in FIG. 3, by way of illustration, using $T_2=300°$ C. and $T_1=80°$ C., the released heat 150 (which is represented in this plot of the heat flow as a function of temperature as the area under the cooling curve between 300° C. and 80° C. multiplied by the density of the TESM where the density may be measured at about 25° C.) may thus include what the skilled artisan would recognize as sensible heat 151 and latent heat 152. FIG. 3 also illustrates the cumulative heat density between 80° C. and 300° C. 153 which is the heat required to heat one liter of the material from 80° C. to 300° C. For example, the heat storage density from 300° C. to 80° C. ($HSD_{300,80}$) would be regarded as the amount of heat released from 1 liter of a thermal energy storage material as it is cooled from 300° C. down to 80° C. $HSD_{300,80}$ may be greater than about 1.0 MJ/l. $HSD_{300,80}$ is preferably greater than about 1.2 MJ/l, more preferably greater than about 1.4 MJ/l and most preferably greater than about 1.6 MJ/l. Similarly, $HSD_{350,80}$ would be regarded as the amount of heat released from 1 liter of a thermal energy storage material as it is cooled from 350° C. down to 80° C. $HSD_{350,80}$ may be greater than about 1.0 MJ/l. $HSD_{350,80}$ is preferably greater than about 1.2 MJ/l, more preferably greater than about 1.4 MJ/l and most preferably greater than about 1.6 MJ/l. The latent heat and the sensible heat are further illustrated in FIG. 4 where the heat (e.g., the stored heat) is plotted against the temperatures. As illustrated in FIG. 4 the TESM (or phase change material) may have a generally constant heat capacity, $c_p$, in the solid state, or over a range of temperatures in the solid state, and the sensible heat 151 increases with the temperature of the TESM (e.g. at a constant rate in the solid state and/or at a constant rate in the liquid state), whereas the latent heat 152 may occur at a very narrow temperature range (e.g. at a single temperature).

Another characteristic of TESM materials is that they may release a large amount of heat when cooled from about 200° C. (preferably from at least a partially liquid state) to about 50° C. (or even from about 150° C. to about 50° C.) while occupying a small volume. As such, the TESM may be characterized by a heat storage density from 200° C. to about 50° C. (i.e. a $HSD_{200,50}$) that may be greater than about 0.5 MJ/l, preferably greater than about 0.6 MJ/l, more preferably greater than about 0.75 MJ/liter and most preferably greater than about 0.9 MJ/liter. The $HSD_{150,50}$ of the TESM may be greater than about 0.45 MJ/l, preferably greater than about 0.5 MJ/l, more preferably greater than about 0.6 MJ/liter and most preferably greater than about 0.75 MJ/liter.

Yet another characteristic of TESMs in accordance with the present teachings is that they exhibit a relatively rapid rate of crystallization, such that the TESM is free of supercooling or has a relatively low amount of supercooling when the TESM is quickly cooled. For example, the TESM (e.g., a 10 mg sample of the TESM) may have a value of $H_{C50}/H_{C1}$ greater than 0.70, preferably greater than 0.80, and more preferably greater than 0.90, where $H_{C50}$ is defined as the quenched heat of crystallization measured by differential scanning calorimetry at a cooling rate of about 50° C./min over a temperature range of $T_L+50°$ C. to $T_L-100°$ C. and $H_{C1}$ is defined as the slow cooled heat of crystallization measured by differential scanning calorimetry at a cooling rate of about 1° C./min.

In certain applications, such as transportation, it may be desirable for the thermal energy storage material to have a relatively low density, e.g. below about 3.6 kg/l, or preferably, below about 3.3 kg/l, and more preferably, below about 3.0 kg/l and most preferably below about 2.5 kg/l (e.g., below about 2.3 kg/l). The density (kg/l) of the thermal energy storage material is measured at room temperature (25° C.) according to ASTM D854. The TESMs likewise may have a relatively low specific gravity as measured for example by a gas pycnometer. For example, the specific gravity of the TESM most preferably may be less than about 2.5 kg/l (e.g., less than about 2.3 kg/l).

Another possible characteristic of TESMs in accordance with the present teachings may be that they will be substantially free of a liquid to gas phase transition or a solid to gas phase transition at a temperature below about 250° C. and more preferably at a temperature below about 300° C. The TESM may also be stable in that it does not decompose at a temperature below about 250°, more preferably at a temperature below about 300° C., and most preferably at a temperature below about 350° C. Preferably, the total equilibrium vapor pressure of the TESM is less than 1 atmosphere at about 250° C., preferably at about 300° C., and more preferably at about 350° C. Because it is possible that many organic compounds may decompose at relatively low temperatures, it may be desirable for the concentration (in wt % based on the total weight of the TESM) of organic compounds in the TESM, if any are present, to be less than about 5 wt %, more preferably less than about 1 wt %. More preferably the TESM may be essentially free of organic compounds or even free of organic compounds. For example, the TESM may be free of an amount of organic compound detectable by FTIR (e.g., the FTIR spectrum of the TESM may have no detectable peaks corresponding to a carbon-hydrogen bond). In this regard, the TESMs may be free of waxes, the TESMs may be free of alcohols (e.g., polyhydric alcohols) or both. The TESMs may be free of a magnesium compound, such as a magnesium nitrate hexahydrate.

Of course, the TESMs may be free of any detectable hydrogen atoms. They may thus also be free of $^-OH$ anions. However, as seen from the teachings above, it may be possible to optionally use small concentrations of hydrogen (e.g. less than about 10 mole % hydrogen, less than about 5 mole % hydrogen, or even less than about 2 mole % hydrogen based on the total number of moles of atoms in the TESM) while maintaining one or more feature of the TESM within the teachings.

Another characteristic of preferred compositions herein is their ability to withstand repeated thermal cycling and retain one or more (and preferably all) of the above characteristics. For instance, TESMs in accordance with the invention may possess the characteristics that, upon repeatedly cycling between the melt and the solid state there is relatively insignificant deterioration in the ability of the TESM to store and release thermal energy. For example a TESM may initially be characterized by an initial heat storage density between $T_2$ and $T_1$ ($HSD_{T2,T1,0}$), and after being cycled between $T_1$ and $T_2$ for n cycles (e.g., about 100 cycles, more preferably at least 1000 cycles, and still more preferably at least about 5000 cycles) at a heating rate of 10° C./min and a cooling rate of −10° C./min, it may be characterized by an aged heat storage density between $T_2$ and $T_1$ ($HSD_{T2,T1,n}$). Thus tested, a suitable TESM may be characterized by a ratio of the aged $HSD_{320,20,100}$ to the initial $HSD_{320,20,0}$ which is greater than about 0.6, preferably greater than about 0.8, more preferably greater than about 0.9, and most preferably greater than about 0.95. Suitable TESM may also be characterized by a ratio of the aged $HSD_{305,40,100}$ to the initial $HSD_{305,40,0}$ which is greater than about 0.6, preferably greater than about 0.8, more preferably greater than about 0.9, and most preferably greater than about 0.95. Suitable TESM may also be characterized by a ratio of the cycled/aged $HSD_{T2,T1,n}$ to the initial $HSD_{T2,T1,0}$ which may be greater than about 0.6, preferably greater than about 0.8, more preferably greater than about 0.9, and most preferably greater than about 0.95 and where $T_2$ may be about 5° C. to about 100° C. above the liquidus temperature of the TESM, $T_1$ may be from about 0° C. to about 80° C., and n may be at least about 100 cycles (e.g. 100 cycles), more preferably at least about 1000 cycles (e.g., 1000 cycles), and more preferably at least about 5000 cycles (e.g. 5000 cycles). For example, a TESM having a liquidus temperature of about 120° C. to about 180° C. may be characterized by a ratio of the aged $HSD_{200,25,100}$ to the initial $HSD_{305,25,0}$ which is greater than about 0.6, preferably greater than about 0.8, more preferably greater than about 0.9, and most preferably greater than about 0.95.

In one particularly preferred aspect, the improved thermal energy storage material (and any system incorporating it) is particularly characterized as including a substantially anhydrous mixture of a) at least one first metal containing compound that includes a nitrate ion, a nitrite ion or both; and b) a second metal compound (e.g., another metal containing compound that includes a nitrate ion, a nitrite ion or both). Preferably, either or both of the first or second metal containing compound includes, consists essentially of, or consists of at least one metal salt, and more preferably includes, consists essentially of, or consists of a metal nitrate or a mixture of metal nitrates, a metal nitrite or a mixture of metal nitrites, or any combination thereof. Exemplary metal nitrates may include sodium nitrate, lithium nitrate, or any combination thereof. Exemplary metal nitrites may include sodium nitrite, lithium nitrite, or any combination thereof.

Without limitation, the TESMs may include a mixture of lithium nitrate and one or more of lithium nitrite, sodium nitrate or sodium nitrite. For example the TESM may include lithium nitrate at a concentration greater than about 35 mole %, preferably greater than about 40 mole %, and more preferably greater than about 44 mole %. The concentration of the lithium nitrate may be less than about 65 mole %, preferably less than about 60 mole %, and most preferably less than about 54 mole %. One particular preferred TESM has a mixture of lithium nitrate and sodium nitrate. The lithium nitrate may be present in the above concentration, and the TESM may include sodium nitrate at a concentration greater than about 35 mole %, preferably greater than about 40 mole %, and more preferably greater than about 46 mole %. The concentration of the sodium nitrate may be less than about 65 mole %, preferably less than about 60 mole %, and most preferably less than about 56 mole %. Another possible combination may substitute lithium nitrite or sodium nitrite for one of lithium nitrate or sodium nitrate per the above teachings.

There may be greater than about 30 mole % Li cations based on the total moles of metal cations in the TESM, and greater than about 30 mole % nitrate anions based on the total moles of anions in the TESM. It is possible that the TESM may have greater than about 15 mole % nitrite anions based on the total moles of anions in the thermal energy storage material. The thermal energy storage material may have from about 40 to about 80 mole % (e.g. from about 55 to about 75 mole %) Li cations based on the total moles of metal cations in the thermal energy storage material, b) from about 40 to about 80 mole % (e.g. from about 55 to about 75 mole %) nitrate anions based on the total moles of anions in the thermal energy storage material, and c) from about 20 to about 60 mole % (e.g. from about 25 to about 45 mole %) nitrite anions based on the total moles of anions in the thermal energy storage material. The TESM may have greater than about 2 mole % (e.g. greater than about 5 mole %, or greater than about 10 mole %) Na cations based on the total concentration of metal cations in the thermal energy storage material.

Though sodium and lithium are most preferred as cations of the compounds used in TESMs herein, other metals may also be substituted (instead of lithium or sodium) in the above amounts. Moreover, other anions may be substituted in the above amounts. Suitable cations may include at least one metal cation as taught previously for preferred metals. For example, the at least one metal cation may be selected from the group consisting of Li, Na, K, Be, Mg, Ca, Al, and Ga). The anions may be a monoatomic anion or a polyatomic anion. Examples of monoatomic anions suitable for the first metal salt include halide ions (e.g. chloride, fluoride, bromide, and iodide ions). Examples of polyatomic anions include nitrate ($NO_3^-$), nitrite ($NO_2^-$), and phosphate ($PO_4^{3-}$) ions. Additional examples of polyatomic anions include acetate ($CH_3COO^-$), carbonate ($CO_3^{2-}$), sulfate ($SO_4^{2-}$), and hydroxide ($OH^-$) ions. Suitable anions may include, without limitation, anions which contain at least one atom selected form the group consisting of S, N, F, Cl, Br, I, P, B, and C. A preferred class of the metal containing compound may preferably contain at least one anion that contains a N atom (e.g. two or more anions which contain a N atom). For example, the preferred class of the metal containing compound may contain a nitrite ion, a nitrate ion, or both.

One possible approach is to combine lithium nitrate or lithium nitrite with one or more second or additional compound, such as lithium fluoride, lithium chloride, sodium hydroxide, sodium fluoride, sodium chloride, magnesium hydroxide, magnesium fluoride, magnesium chloride, or any combination thereof. Such second or additional compounds (e.g. a third metal, compound or third metal salt) may be selected from the metal containing materials previously identified and preferably will be different in composition, property or both from the lithium nitrate or lithium nitrite or other first metal containing material.

Other examples of the second or additional compounds might include potassium hydroxide, potassium fluoride, potassium chloride, calcium hydroxide, calcium fluoride, and calcium chloride. Metal bromides may also be used. The second or additional metal compound may contain lithium hydroxide. Examples of second metal containing compounds which contain multiple metal ions or multiple anions include: mixtures of magnesium fluoride, sodium fluoride and lithium fluoride; mixtures of sodium chloride, sodium fluoride and lithium fluoride; or mixtures of lithium hydroxide, lithium fluoride, sodium fluoride, and magnesium fluoride.

As illustrated before (with the sodium and/or lithium nitrates and/or nitrites) a suitable TESM may consist essentially of a binary mixture of a first metal compound and a second metal compound. As one example, the first metal compound may be lithium nitrate and the second metal compound may be a different compound (e.g., lithium hydroxide). In such a mixture, the concentration of lithium nitrate is preferably at least about 25 mole % and the concentration of the lithium hydroxide is preferably less than about 75 mole % based on the total concentration of lithium nitrate and lithium hydroxide. As a second example, the first metal compound consists essentially of sodium nitrate and the second metal compound consists essentially of lithium hydroxide. In another example, the first metal compound consists essentially of lithium nitrate and the second metal compound consists essentially of lithium fluoride. In this example, the concentration of the lithium nitrate is preferably at least about 50 mole % and the concentration of the lithium fluoride is preferably less than about 50 mole %, based on the total concentration of lithium nitrate and lithium fluoride. The mixture may also be a binary mixture where the first metal compound consists essentially of sodium nitrate and the second metal compound consists essentially of lithium fluoride, preferably where the concentration of the sodium nitrate is at least about 50 mole % and the concentration of the lithium fluoride is less than about 50 mole %, based on the total concentration of sodium nitrate and lithium fluoride.

A suitable thermal energy storage material may also be a mixture of more than two compounds (e.g. at least three compounds, such as three metal compounds). For example, the thermal energy storage material may include consist essentially of sodium nitrate, lithium nitrate and lithium fluoride. Here, it is preferred that the combined concentration of the sodium nitrate and lithium nitrate is at least about 50 mole % (e.g., at least about 75 mole %, or even at least about 95 mole %) based on the total concentration.

More generally, the thermal energy storage material may include or consist essentially of a first metal compound which is lithium nitrate, sodium nitrate, or a combination thereof, and one or more additional metal compounds which may be selected from the group consisting of sodium hydroxide, sodium chloride, sodium fluoride, magnesium hydroxide, magnesium, magnesium fluoride, lithium hydroxide, lithium chloride, and lithium fluoride. In one example, the second metal compound consists of one, two, or three metal compounds selected from the group consisting of magnesium fluoride, sodium fluoride, and lithium fluoride and the concentration of the first metal compound is from about 50 to about 95 mole %, based on the total concentration of the first metal compound and the second metal compound. One or more additional metal compounds may be selected from the group consisting of sodium chloride, sodium fluoride, and lithium fluoride and the concentration of the first metal compound is from about 50 to about 95 mole %, based on the total concentration of the first metal compound and any additional metal compound. For example the first metal compound may consist essentially of lithium nitrate, sodium nitrate, or a combination thereof, and the additional metal compound may consist essentially of sodium fluoride and lithium fluoride. If present the concentration of magnesium fluoride should be less than about 30 mole %, based on the total concentration.

One TESM which may be used includes Li cations, nitrate and/or nitrite anions, and at least one additional anion or cation. For example, the concentration of the Li cations may be greater than 30 mole % based on the total moles of metal cations in the TESM, the concentration of the nitrate anions may be at least 30 mole % based on the total moles of anions in the TESM, or both. Such a TESM may also include nitrite anions at a concentration greater than about 15 mole % based on the total moles of anions in the TESM. For example, the TESM may contain a) from about 40 mole % to about 80 mole % Li cations (more preferably from about 55 to about 75 mole % Li cations) based on the total concentration of cations in the TESM; b) from about 40 mole % to about 80 mole % nitrate anions (more preferably from about 55 to about 75 mole % nitrate anions) based on the total concentration of anions in the TESM; and c) from about 20 mole % to about 60 mole % nitrite anions (more preferably from about 25 to about 45 mole % nitrite anions) based on the total concentration of anions in the TESM. Any of the above TESMs may additionally include Na cations, K cations, or both. For example, the additional Na and/or K cations may be present at a concentration of at least about 2 mole %, preferably at least about 5 mole % and most preferably at least about 10 mole %. It is further contemplated that Mg cations, Ca cations, or both may be added to any of the above compositions.

In addition to the anions and cations, the TESM compositions or systems herein may also include one or more other agents or ingredients as the following illustrates. For example, preferred compositions or systems herein may include the TESMs above described and one or more agents selected from a thermal conductivity promoter, a corrosion inhibitor, a nucleator, or any combination thereof.

A suitable TESM may have a high thermal conductivity in order that the heat being transferred to the TESM is relatively rapidly conducted throughout the material. If the metal compound or the mixture of metal compounds used in the TESM has a low thermal conductivity, an additional compound or ingredient can be added as a thermal conductivity promoter, thereby increasing the effective thermal conductivity of the material. Any suitable art-disclosed conductivity promoter suitable for the operating conditions could be utilized. Examples of conductivity promoters include, without limitation, metal whiskers, metal platelets, graphite, divided graphite, graphene, or any combination thereof. Similarly a conductive structure such as a wire mesh (e.g. a copper wire mesh) or metal wool could be incorporated into the thermal energy storage material. Preferably, the thermal conductivity promoter has a thermal conductivity of at least about 100 W/(m·K), more preferably at least about 220 W/(m·K) (e.g. at least about 300 W/(m·K)) as measured for example by ASTM Standard E1225-04. In one embodiment of the invention, the conductivity promoter remains in the solid state at the maximum operating storage temperature.

In general, the TESM systems herein will include a TESM that is compatible with any material it contacts in service. As will be discussed, it is contemplated that systems herein will employ a container (e.g., capsules) that contain a selected volume of the TESM. It is contemplated that the container may be sealed. It is also contemplated that the container may include an inner wall surface that contacts the TESM, which has a metal oxide, complex oxide, or other stable metal compound on it. For example, the container may be metal, and may have a native oxide on it. Systems herein are contemplated to exhibit compatibility between any metal, metal oxide and TESM in contact with each other over the operational temperature range of the system. To this end, the system is generally resistant to corrosion mediated by the interaction between the TESM and the container wall surface, particularly after prolonged exposure (e.g., 45 days or longer) to an elevated temperature (e.g., of about 300° C.). Corrosion resistance of the container of the system may be determined by placing a sample of the container material having a total surface area of about 60 cm$^2$ into a crucible made of the same material as the sample and filled with molten TESM. The surfaces of the sample are contacted with the TESM throughout the test, and the crucible is heated in an autoclave purged and filled with an inert gas such as dry nitrogen at about 300° C. for about 45 days. Thus tested, the sample of the container material upon extraction from the crucible and removal of TESM residue preferably exhibits an absolute value of weight change (e.g., a weight increase due to oxidation, or a weight decrease due to etching) of less than about 6 mg, more preferably less than 3 mg, and most preferably less than about 1 mg. The weight change may be expressed in terms of the ratio of the weight gain to the surface area of the sample being tested. For example the weight gain per surface area may be less than 1 g/m$^2$, preferably less than 0.5 g/m$^2$, more preferably less than 0.17 g/m$^2$ and most preferably less than 0.1 g/m$^2$. Such a material would thus be generally corrosion resistant consistent with the present teachings. A still preferred characteristic of the generally corrosion resistant materials herein is that they will also exhibit the above characteristics after repeated (e.g., 100 or more cycles, 1000 or more cycles, or even 5000 or more cycles) cycling from room temperature to about 300° C. (e.g., as heated and cooled at a rate of about 10° C./min.

TESMs (though they may be intrinsically a corrosive material) suitably may be employed so it will not significantly corrode any container (e.g., any capsule as will be described) in which it is stored. Accordingly, optionally, an agent for inhibiting corrosion may be employed, in an amount sufficient for resisting corrosion, as part of a TESM or system herein. Such an agent may be a thermodynamic corrosion inhibitor, a kinetic corrosion inhibitor, or both. The agent may include a metal oxide, a precursor that converts to a metal oxide, or any combination of such materials. The agent may be such that it can phase separate from the TESM and deposit onto a wall of a container that holds the TESMs (e.g., a wall of a capsule of a blister pack). Therefore, it may be advantageous to add an excess of a metal oxide to the thermal energy storage material composition such that the solubility limit is reached or exceeded. As an alternative, a compound which decomposes into a metal oxide could be included in the TESM. As an example, aluminum nitrate readily decomposes into aluminum oxide, which may therefore be an effective agent.

Some TESMs, when placed in a container that has a metal oxide surface, e.g. a native metal oxide layer, will dissolve the metal oxide layer until a saturation level of the metal oxide is reached. If the volume of the thermal energy storage material is high enough, it may even dissolve the entire metal oxide layer. Once the metal oxide layer is partially or completely removed, the container may be more susceptible to corrosive attack, perhaps by the thermal energy storage material. If an excess of metal oxide is added to the thermal energy storage material (e.g. an amount over the saturation limit of the metal oxide in the thermal energy storage material), the metal oxide layer on the surface of the container will be stable and will not dissolve over time. To help assure effectiveness, preferably the agent (e.g. a metal oxide) will be present in a concentration above the saturation concentration of the agent (a metal oxide) in the thermal energy storage material. Typically the concentration of the metal oxide in the TESM is less than about 20 wt % (preferably less than 5 wt. %) by weight of the thermal energy storage material. The concentration of the metal oxide in the TESM should be at least 0.5% by weight, and more preferably, at least 2% by weight of the TESM. It should be recognized that this agent and other potential additives, may not necessarily be in a solution with the TESM, or otherwise might not be regarded as being in the TESM. If the latter is the case, then the concentrations recited herein for such agent or additive, refers to the percentage by weight that the agent or additive occupies relative to the overall system of materials (i.e., the combination of TESM and any agent or additive) that includes the agent or additive and the TESM. As an example, aluminum nitrate may be a precursor to aluminum oxide and may be used as such an agent. One such effective agent may be alumina ($Al_2O_3$) powder at a concentration of about 2 mole %, based on the total concentration of the TESM.

It is also contemplated that the TESMs of the present invention may include one or more agents for assisting crystallization of the TESMs during cooling of the TESMs. The TESM may thus also include a nucleator or other means for increasing the crystallization rate, increasing the crystal nucleation rate, increasing the crystal growth rate, increasing the number of crystals, or any combination thereof. For instance, it is possible that the TESMs may include a suitable nucleator, or another agent for providing a relatively low energy site from which crystals are nucleated, grown or both during cooling. By way of example, it may be possible to include as part of the TESMs composition up to about 10 percent by weight of such an agent (e.g., a nucleator), and more preferably less than about 5 percent by weight, and still more preferably less than about 1 percent by weight (e.g., about 0.5 percent by weight or less). Without limitation, examples of a suitable nucleator may include, a compound including an alkaline metal, a metal oxide, a carbonate (e.g. an alkaline metal carbonate), a sulfate, a phosphate, a fluoride, a borate or any combination thereof. Suitable nucleators are preferably in a crystalline phase a temperature greater than the liquidus temperature of the TESM.

The present invention is also directed at a process for preparing TESMs such as those described herein. In many cases, these compounds can be easily combined by heating the compounds to a temperature greater than the liquidus temperature of the metal compound having the highest liquidus temperature and mixing. However, in some mixtures, one of the metal compounds may have a decomposition temperature lower than the liquidus temperature of the metal compound having the highest liquidus temperature. In such a situation, another mixing process may be employed. For example, it is contemplated that one process for mixing the thermal energy storage material may include selecting a combination of materials to be employed in a material system, the material having compounds with different liquidus temperatures. The highest liquidus temperature metal compound having a first liquidus temperature is heated to a temperature greater than the first liquidus temperature (preferably in the absence of any of the other materials to be employed in the system). A decomposable metal compound having a second liquidus temperature and a decomposition temperature is mixed with the highest liquidus temperature metal compound. Preferably, the first liquidus temperature is greater than second liquidus temperature and the temperature of the mixture decreases to a temperature lower than the decomposition temperature upon addition of the decomposable metal compound to the molten highest liquidus temperature compound.

In another example, a process for mixing the thermal energy storage material may include steps of selecting a combination of at least three materials (e.g. a decomposable metal compound (which may be the first metal compound), a highest liquidus temperature metal compound (which may be the second metal compound), and a third metal compound having a third liquidus temperature)) to be employed in a material system, so that the compounds of the material each have different liquidus temperatures. The highest liquidus temperature metal compound having a first liquidus temperature and the third metal compound having a third liquidus temperature are heated to a first mixing temperature which is greater than the third liquidus temperature (preferably greater than the first liquidus temperature) to form a first mixture having a first solidus temperature lower than the first liquidus temperature. Next, the decomposable metal compound having a second liquidus temperature and a decomposition temperature (which is lower than the first liquidus temperature) and the first mixture are mixed at a second mixing temperature below the decomposition temperature to form a second mixture having a second solidus temperature which is lower than the decomposition temperature. Preferably, the first solidus temperature is lower than the decomposition temperature. The second mixing temperature may or may not be lower than the first solidus temperature.

In another example, the improved process can include steps of selecting a combination of at least two materials (including a decomposable metal compound and a highest liquidus temperature metal compound) to be employed in a material system, the materials including compounds having different liquidus temperatures. The highest liquidus temperature metal compound having a first liquidus temperature and the decomposable metal compound having a decomposition temperature are provided. The highest liquidus temperature metal compound and the decomposable metal compound are heated to a temperature below the decomposition temperature to form a first mixture. In this process, there may also be a step of encapsulating the at least two materials (e.g. the metal compounds) that are used to make the thermal energy storage material prior to the heating step.

In any of these processes there may also be one or more intermediate steps of adding one or more additional metal compounds before the step of adding the decomposable metal compound. It is further contemplated that the improved process will include a cooling step before adding the decomposable metal compound. A step of encapsulating the thermal energy storage material is also contemplated. It may occur before, during or after the compounds are heated and mixed. A step of adding one or more agents selected from a thermal conductivity promoter, a corrosion inhibitor, a nucleator, or any combination thereof is also possible.

The process may also include one or more steps of drying the TESM and/or one or more of the materials used for preparing the TESM (e.g., at a time immediately preceding sealing the TESM in a container). For example, the process may include a step of exposing one of these materials to a dry environment, such as an environment containing a dessicant. The process may include a step of removing water by heating one of the materials (e.g., the TESM), preferably in an inert or relatively dry atmosphere (e.g., having a relative humidity less than about 20%, preferably less than about 10%, more preferably less than about 5%, and most preferably less than about 1%. For example, the TESM and/or a material used for preparing the TESM may be heated to a temperature greater than about 100° C., preferably greater than about 150° C., more preferably greater than about 200° C., and most preferably greater than about 250° C. The heating time may be long enough to remove essentially all of the water or to reduce the water concentration to a relatively low concentration as earlier described. The process may also include one or more steps of storing the TESM and/or one or more of the materials used for preparing the TESM in a relatively dry environment (e.g., in a dessicant containing container, in a glove box with a dry atmosphere, in a hermetically sealed container, under vacuum, and the like), such that the water concentration is maintained at a relatively low concentration (e.g., such that the material continues to be substantially free of water).

Other processes can be gleaned elsewhere from the teachings herein, as well as U.S. Provisional Patent Application Ser. Nos. 61/030,755 (filed Feb. 22, 2008); 61/061,908 (filed Jun. 16, 2008); 61/074,799 (filed Jun. 23, 2008); 61/074,840 (filed Jun. 23, 2008); 61/074,869 (filed Jun. 23, 2008); 61/074,889 (filed Jun. 23, 2008); and 61/090,084 (filed Aug. 19, 2008), all incorporated by reference.

As will be appreciated from the foregoing, though preferred material systems are described, the teachings herein do not foreclose others that satisfy the desired characteristics for a TESM. One aspect of the present teachings contemplates a process for designing a suitable material system based upon known information about candidate materials for the system. To illustrate, the heat storage density, the eutectic temperature, and the heat of fusion density can be estimated for mixtures of N different metal salts if the melting temperature, heat of fusion, density at 25° C., molar mass and the specific heat are known for each component in the mixture. From that information, other characteristics may be employed to arrive at the desired system.

Without being bound by theory, a description of the thermodynamics of these mixtures is presented. The entropy of fusion, $S_{fi}$, for a single component i is given by:

$$S_{fi} = H_{fi}/T_{mi},$$

where $H_{fi}$ is the heat of fusion of component i and $T_{mi}$, is the melting temperature in K for component i.

For an ideal eutectic system, where the components are immiscible in the solid state and completely miscible in the liquid state, the molar free energy of fusion $G_f(T,x_i)$ is given by:

$$G_f(T,x_i) = \Sigma x_i H_{fi} m - T[(\Sigma x_i S_{fi}) + (\Sigma x_i \ln x_i)]$$

where the summation is over the N components, T is the temperature in K, $x_i$ is the molar fraction of component i, and the term $\Sigma x_i \ln x_i$ corresponds to the entropy of mixing of the N components.

Again without being bound by theory, by finding a solution of $G_f(T,x_i)=0$, one can estimate the eutectic temperature and the eutectic composition. Having thus estimated the eutectic composition, the molar heat of fusion at the eutectic composition can be calculated from the equation below:

$$H_f(T_e) = T_e \Sigma x_i H_{fi}/T_{mi}$$

The heat capacity of the mixture can be estimated by the weighted average of the heat capacity of the individual components. The sensible heat density $(SHD_{T1,T2})$ between $T_1$ and $T_2$ is calculated by integrating the heat capacity over that temperature range:

$$SHD_{T1,T2} = \int \rho c_p dT,$$

where $\rho$ is the density in units of kg/l and $c_p$ is the temperature dependent heat capacity in units of MJ/(kg·° K.), and the integration is from $T_1$ to $T_2$.

TESM systems herein may be encapsulated in a capsular structure (e.g. a structure including one or a plurality of capsules each having a volume of less than about 200 ml, preferably less than about 50 ml, more preferably less than about 10 ml, and most preferably less than about 3 ml, and/or having a volume greater than about 0.1 ml, and more preferably greater than about 0.3 ml). The capsular structure in turn may be incorporated as part of an array (as described elsewhere herein), and more preferably a 3-dimensional array, where plural individual capsules are in thermal conducting relationship with each other, and with a heat transfer fluid. For example, the capsular structure may include a plurality of stacked embossed metal foil (or other metal sheet) blister packs, which may be contained in a suitable vessel (e.g., an insulated container, such as a vacuum insulted container) that affords a flow path for one or more heat exchange devices and/or fluids that will operate to charge or discharge the TESMs.

Examples of structures suitable for encapsulating the TESMs are disclosed in application Ser. No. 12/389,598 entitled "HEAT STORAGE DEVICES" filed on Feb. 20, 2009, (see, e.g., FIGS. 1-6 and 8-9 and associated discussion), which are hereby expressly incorporated by reference herein for all purposes. As also taught in that application, assemblies of capsular structures (e.g., a plurality of arrays of capsules) may be assembled within a suitable housing to define a heating module, which also may include means for circulating a heat exchange fluid through the module (e.g., one or more of conduits, pumps, blowers or the like). The material that is used to form the arrays or capsules preferably is a metal. Though a metal such as aluminum may be used, a preferred metal is a stainless steel (e.g., a ferritic stainless steel, an austenitic stainless steel, and/or a martensitic stainless steel). The metal preferably is such that it has a metal oxide (e.g., a native metal oxide) that exists during service operation, such as on an interior wall of a capsule or other container that directly interfaces with the TESM. Preferably, the TESM will be stable relative to any such oxide, and will exhibit substantially no thermodynamic reactivity with it under service conditions.

Figure 12:
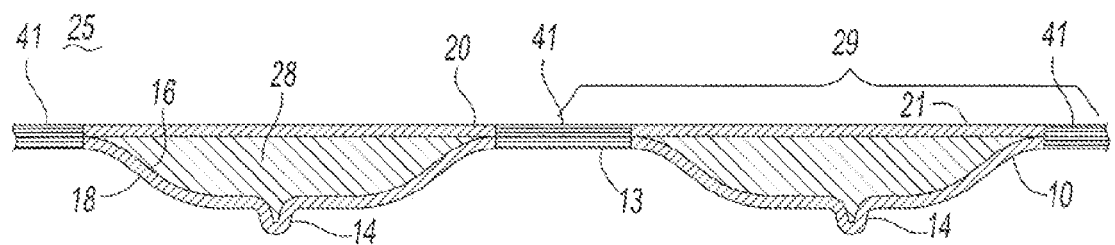
FIG. 12 illustrates a cross-section of a diffusion bonded assembly of two plies having an array of capsules containing a thermal energy storage material (e.g. a blister pack).

FIG. 12 illustrates an example of a cross-section of a blister pack 25 formed of a first ply 10 and a second ply 20, and having a TESM 28 located in the capsules 29 of the blister pack. The capsules may also have one or more nubs or bumps 14 which may function as spacers. The second ply may have an outer surface 21 which may be flat. The first ply and the second ply may have a bead or metallurgical bond 41 that is preferably is in the lip 13 of the first ply 10. The thermal energy storage material system may include a container having a wall surface, such as illustrated in FIG. 12. The thermal energy storage material may fill 70% or more of the cavity of the container, such as illustrated in FIG. 12.

The present teachings also contemplate heat storage devices, modules and systems that employs a TESM. In one broad sense, the present teachings contemplate the use of a TESM in a heat storage device, module or system that includes a housing (e.g., an insulated container or other suitable housing), a heat source and/or heat collector for heating the TESM so that the TESM undergoes a solid to liquid phase transition, and a suitable structure or mechanism that transfers heat from the housing such that the device, module, or system provides heat derived from a later liquid to solid phase transition.

The TESMs herein preferably will be such that they are used in applications in which the operating temperatures will cause the TESMs to undergo at least one phase transition. The performance of the TESMs herein makes the TESMs particularly suitable for use in relatively compact structures, thereby also making it attractive for use in any of a number of methods or applications to provide custom ambient heating solutions, rapid ambient heating solutions, efficient heating solutions, heating solutions that allow for re-allocation of energy resources, heating solutions that allow for reduced consumption of energy resources, or any combination thereof. Systems using the TESMs herein may be used for delivering of heat to passengers and/or components (e.g., an engine and/or a catalyst) of a transportation vehicle (e.g., an automotive vehicle). TESMs according to the present teachings may be employed in internal combustion engine powered vehicles (e.g., conventional gasoline or diesel fueled vehicles), fully electric powered vehicles (e.g., battery powered vehicles), fuel cell powered vehicles (e.g., from the use of hydrogen fuel cells), hybrid powered vehicles that include a combination of two or more of such power sources. They may be used in combination with another heating source, for reducing load on the other heating source. It may be used in a vehicle for increasing the range of the vehicle usage per unit of energy needed to operate the vehicle. They may be used in a system for conversion into electricity via a thermoelectric device. It will be appreciated however that the invention is not limited only to vehicle applications but may be employed in other applications as well. Systems using the TESMs herein may be such that they will release greater than about 2000 kJ, and preferably greater than about 3000 kJ and most preferably greater than about 4000 kJ (e.g. more than about 6,000 kJ) when the thermal energy storage material is cooled over a span of about 200° C. (e.g., from 300° C. to 80° C.).

It will also be appreciated from the discussion herein that TESMs may be employed in a process of reclaiming heat which includes the steps of: a) transferring at least a portion of a source heat from a heat source and/or a heat collector; b) heating the TESM using the source heat; c) increasing the amount of the liquid phase in the TESM by converting at least a portion of the source heat into latent heat; d) maintaining the amount of the liquid phase in the TESM to store the latent heat; e) converting at least a portion of the latent heat into released heat; and f) transferring the released heat to an object to be heated. TESMs may be employed in a process for reclaiming heat that may include one or both of a) heating a combustion engine or a circulating fluid for heating a combustion engine from a temperature of less than 5° C. to a temperature of at least 60° C. in a time of less than 60 seconds, or b) heating an air stream for heating a cockpit from a temperature of less than 5° C. to a temperature of at least 40° C. in a time of less than 60 seconds. TESMs may be employed in a process for cold starting an automotive vehicle having a powertrain which includes the steps of: i) storing heat in a thermal energy storage material (TESM); and ii) discharging the stored heater from the TESM greater than about 2000 kJ (e.g., greater than about 3000 kJ or greater than about 4000 kJ) over a period less than 120 seconds while the vehicle powertrain is substantially at ambient. The invention thus also contemplates a step of using the TESMs of the present teachings for heating input air from about 0° C. to about 30° C. at a rate of about 12 liters/second for a time of at least about 30 minutes, more preferably at least 60 minutes, and still more preferably at least 120 minutes, without applying any external heat supply to any such module (e.g., without supplying an electric current to any electric heater of the modules).

For example, various aspects of the invention may be used in heating applications such as vehicle applications such as i) cold start heating of an engine (e.g., using a heat transfer fluid), a passenger compartment, a window, or any combination thereof; ii) heating of a passenger compartment, a window, or both on a plug-in electric vehicle, a plug-in hybrid electric vehicle (i.e., a PHEV), or a hybrid vehicle (HEV) using electricity from an electric grid; iii) providing multiple heating locations for more efficient and targeted heating (localized or satellite heating); iv) heating an engine block, engine oil, a passenger compartment, or any combination thereof while the vehicle is in an engine-off mode; v) heating a battery in an electric vehicle, a PHEV, or an HEV; vi) heating a transmission or transmission oil; vii) heating a wiper fluid or some other working fluid; viii) heating a catalyst; or any combination thereof. The invention may be used for heating components such as an internal combustion engine, a transmission, a catalytic converter, a cockpit (e.g., an air stream for heating a cockpit), a passenger seat, a window or windshield, or a circulating fluid (e.g., a liquid or gas) for providing heat to any of the above components. The invention may be used to heat one, two, three, four or any combination of these vehicle components. The invention may be used for storing heat generated by a vehicle component such as from an engine block, a fluid circulation system, an intercooler, a radiator (e.g., air or liquid), a turbocharger, a compressor for an air conditioning unit, engine oil, a transmission, transmission fluid, an exhaust manifold, an exhaust pipe, a catalytic converter, an exhaust tip, a heat shield, mounting hardware, a muffler, a braking component, a shock absorber, or an electric resistance heater. In one preferred aspect, the systems herein may be used in a transportation vehicle application that includes a step of i) heating an internal combustion engine or a circulating fluid for heating a combustion engine from a temperature of less than 5° C. to a temperature of at least 60° C. in a time of less than 60 seconds; ii) heating an air stream for heating a cockpit from a temperature of less than 5° C. to a temperature of at least 40° C. in a time of less than 60 seconds; or both (i) and (ii).

Additional applications which may use the heat storage device disclosed herein include: heating the air in a building or water (e.g., heating in the winter using solar energy collected in the summer); heating a building with a furnace having improved efficiency; heating non-automotive battery cells; heating an electrochemical battery; and heating of floors using a solar hydronic system, an electric system or both. Additional examples of objects that may be heated include a fluid vessel (e.g., the water in a hot water tank), a circulating fluid (e.g., an air stream or a liquid) for heating a building, a cooking device, a turbine, a hot plate, a laundry dryer (i.e., a tumble dryer), a heat engine (e.g., a Rankine or Brayton Cycle) to generate electric power or to power a compressor of an air conditioning unit, and a working fluid of an absorption or adsorption cycle air conditioning system. Additional heat sources thus may include heat generated by one or more of: the sun, a lawn mower motor, a motor for a snow removal device, a conveyer (e.g., an escalator, an elevator, or a conveyor belt), an oven, a home appliance, paving equipment, a watercraft motor, a solar heat collector, an exhaust stack, a non-automotive braking system, a resistance heater, a chemical reactor, a condenser unit of an air conditioning system and a geothermal circulating fluid.

The heating modules may contain any amount of TESM. Preferably the plurality of heating modules contain a total volume of thermal energy storage material, $V_t$ wherein $V_t$ may be less than about 8 liters, preferably less than about 5 liters, and more preferably less than about 3 liters. The total mass of the TESM in the plurality of heating modules may be less than about 18 kg, preferably less than about 10 kg, more preferably less than about 7 kg, and most preferably less than about 5 kg.

TESMs, heating devices and systems (e.g., heat storage devices and heat storage systems), heating modulus, and heat storage process which may be useful for the vehicle components and heating processes of the present invention are further described in U.S. Provisional Patent Application Ser. Nos. 61/030,755 (filed Feb. 22, 2008); 61/061,908 (filed Jun. 16, 2008); 61/074,799 (filed Jun. 23, 2008); 61/074,840 (filed Jun. 23, 2008); 61/074,869 (filed Jun. 23, 2008); 61/074,889 (filed Jun. 23, 2008); and 61/090,084 (filed Aug. 19, 2008), and U.S. patent application Ser. No. 12/389,598 entitled "HEAT STORAGE DEVICES" filed on Feb. 20, 2009, the contents of which are hereby incorporated by reference in their entirety.

EXAMPLES

For the following examples, similar results are expected for variations of +/−20% of the stated concentration amounts. For example, results described in the following are expected to be within +/−30% of the stated values for concentrations that may vary by +/−20% of the stated values.

Example 1

A 5 g mixture containing 40 mole % of powdered lithium nitrate and 60 mole % of powdered lithium hydroxide is prepared by first mixing wet grinding and mixing the two anhydrous salts with a mortar and pestle in acetone. The acetone slurry is then poured into a fused silica crucible with a fused silica lid, both lined with aluminum foil. After vacuum drying at room temperature to remove the acetone, the crucibles are placed in a furnace and heated from room temperature to 300° C. at a rate of 5° C./min. The samples are held at 300° C. for 1 hour. While at the elevated temperature, the samples are stirred about every 5 minutes by shaking the entire furnace. These binary mixtures of lithium nitrate and lithium hydroxide are then cooled to room temperature. The liquidus temperature and the heat storage density from 300° C. to 80° C. of these samples is then measured. The heat storage density ($HSD_{300,80}$) is greater than 1.4 MJ/l and the liquidus temperature is about 190° C.

Example 2

A 5 g mixture of 85 mole % lithium nitrate and 15 mole % of an eutectic mixture of a mixed metal fluoride salt containing $MgF_2$, NaF, and LiF (having a ratio of $MgF_2$:NaF:LiF of about 10:43:47 and a eutectic transition temperature of about 630° C.) is prepared in a manner similar to Example 1. To homogenize the metal salts, a furnace is heated to 500° C. at 5° C./min, and is then held for 1 hour at 500° C. The mixed metal fluoride dissolves in the molten lithium nitrate under these conditions. The sample is then cooled to room temperature. The sample is polished in order to perform optical microscopy studies of the structure and for compositional analysis using electron microscopy. The liquidus temperature and the heat storage density from 300° C. to 80° C. of these samples is then measured. The heat storage density ($HSD_{300,80}$) is greater than 1.6 MJ/l and the liquidus temperature is about 196° C.

Example 3

A 5 g mixture of 85 mole % lithium nitrate and 15 mole % of an eutectic mixture of a mixed metal salt containing NaCl, NaF, and LiF (having a ratio of NaCl:NaF:LiF of about 24:36:40 and a eutectic transition temperature of 582° C.) is prepared in a manner similar to Example 2. After homogenizing at 500° C. for 1 hour and cooling to room temperature this sample is polished in order to perform optical microscopy studies of the structure and for compositional analysis using electron microscopy. The liquidus temperature and the heat storage density from 300° C. to 80° C. of these samples is then measured. The heat storage density ($HSD_{300,80}$) is greater than 1.4 MJ/l and the liquidus temperature is about 250° C.

Example 4

A 5 g mixture of lithium nitrate, lithium hydroxide and an eutectic mixture of a mixed metal fluoride salt containing $MgF_2$, NaF, and LiF (having a ratio of $MgF_2$:NaF:LiF of about 10:43:47 and a eutectic transition temperature of about 630° C.) is prepared in a manner similar to Example 2. The liquidus temperature and the heat storage density from 300° C. to 80° C. of these samples is then measured. The heat storage density ($HSD_{300,80}$) is greater than 1.4 MJ/l and the liquidus temperature is about 180° C.

Example 5

A thermal energy storage material, LT1, is prepared by mixing about 66.2 wt % $LiNO_3$, about 16.5 wt % $NaNO_2$ and about 17.3 wt % $KNO_2$ using the process of Example 1. The liquidus temperature and the heat storage density from 200° C. to 50° C. of these samples is then measured. The heat storage density ($HSD_{200,50}$) is greater than 1.1 MJ/l and the liquidus temperature is about 135° C.

Example 6

A thermal energy storage material, LT2, is prepared by mixing about 62.4 wt % $LiNO_3$, and about 37.6 wt % $NaNO_2$ using the process of Example 1. The liquidus temperature and the heat storage density from 200° C. to 50° C. of these samples is then measured. The heat storage density ($HSD_{200,50}$) is greater than 1.2 MJ/l and the liquidus temperature is about 150° C.

Example 7

A thermal energy storage material, MT1, is prepared by mixing about 48 wt % $LiNO_3$, and about 52 wt % $NaNO_3$ using the process of Example 1. The liquidus temperature and the heat storage density from 300° C. to 80° C. of these samples is then measured. The heat storage density ($HSD_{300,80}$) is greater than about 1.5 MJ/l and the liquidus temperature is about 220° C.

Example 8

A thermal energy storage material is heated in a differential scanning calorimeter to a temperature of about 325° C. and then cooled to about 50° C. at a rate of about 10° C./min. The sensible and latent heats are recorded as represented in FIG. 1. The heat storage density from 300° C. to 80° C. ($HSD_{300,80}$) is measured by integrated the area under the curve between these temperatures. The heat storage density, thus measured is about 1.5 MJ/l.

Example 9

Figure 5A:
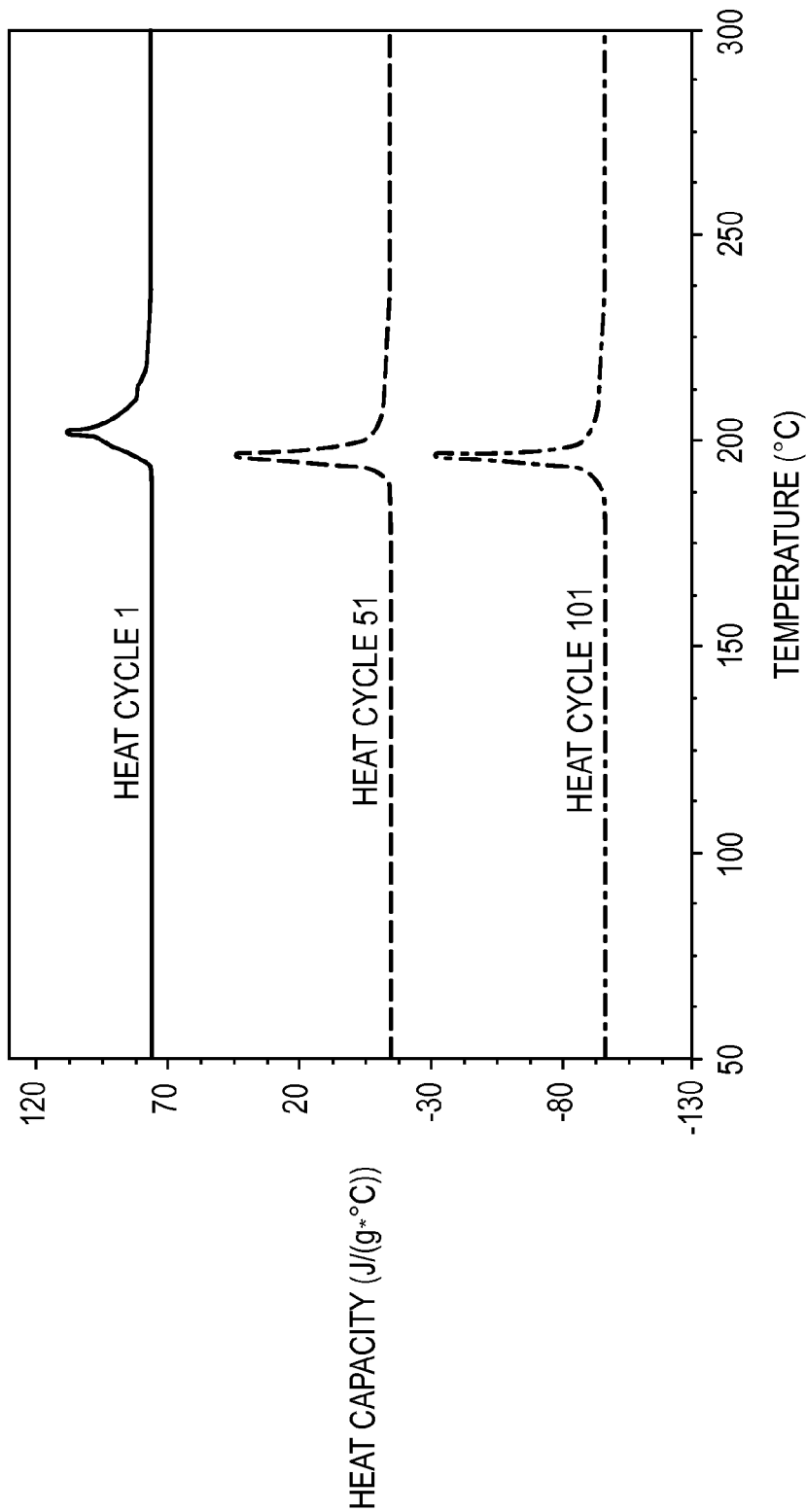
FIG. 5A illustrates a plot of crystallization curves of an illustrative TESM within the present teaching for its 1st, 51st and 101st cycles from about 20° C. to about 320° C.
Figure 5B:
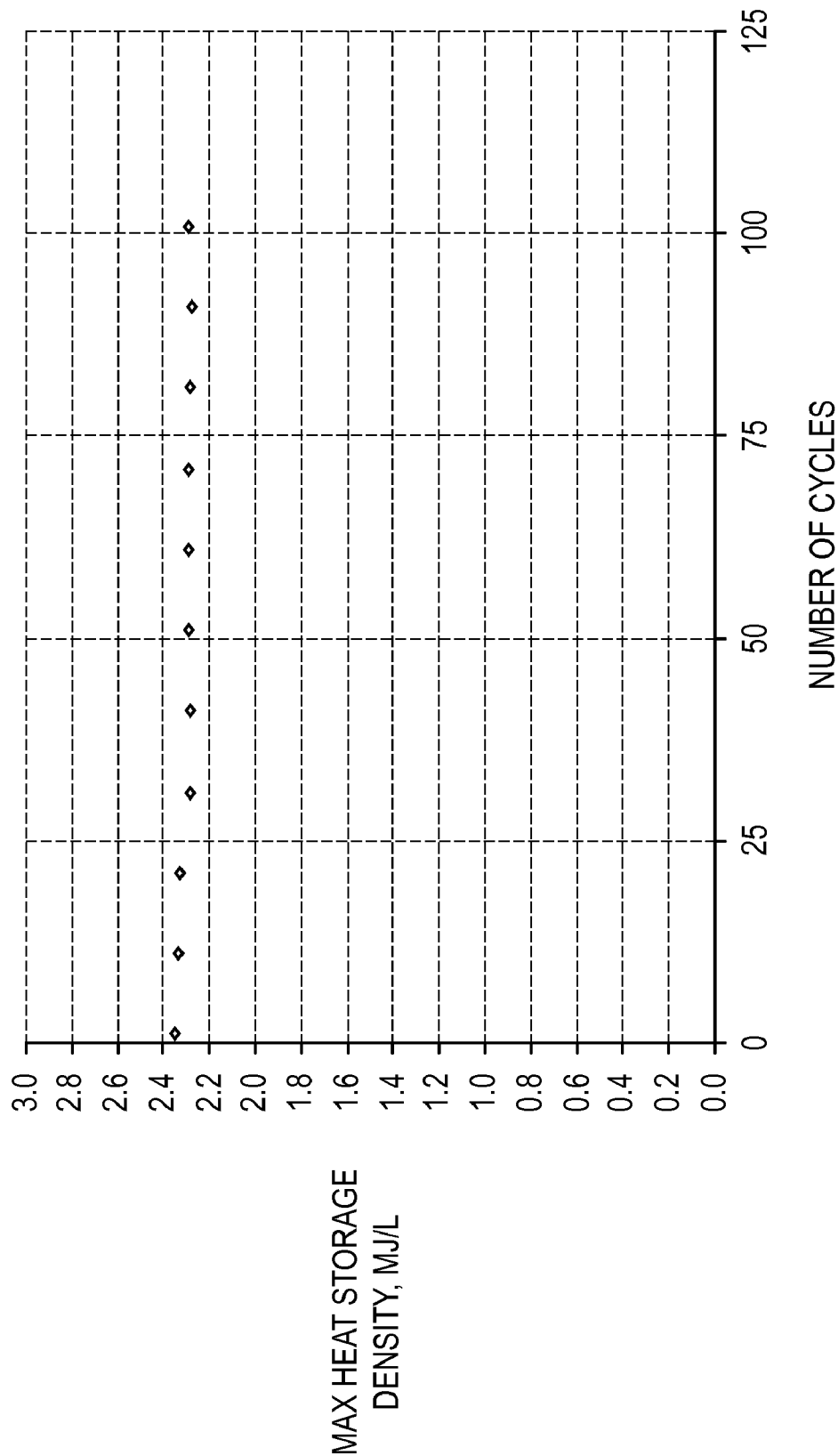
FIG. 5B illustrates the variation in the heat storage density from 320° C. to 20° C. for an illustrative TESM as a function of the number of cycles between 20° C. and 320° C.
Figure 5C:
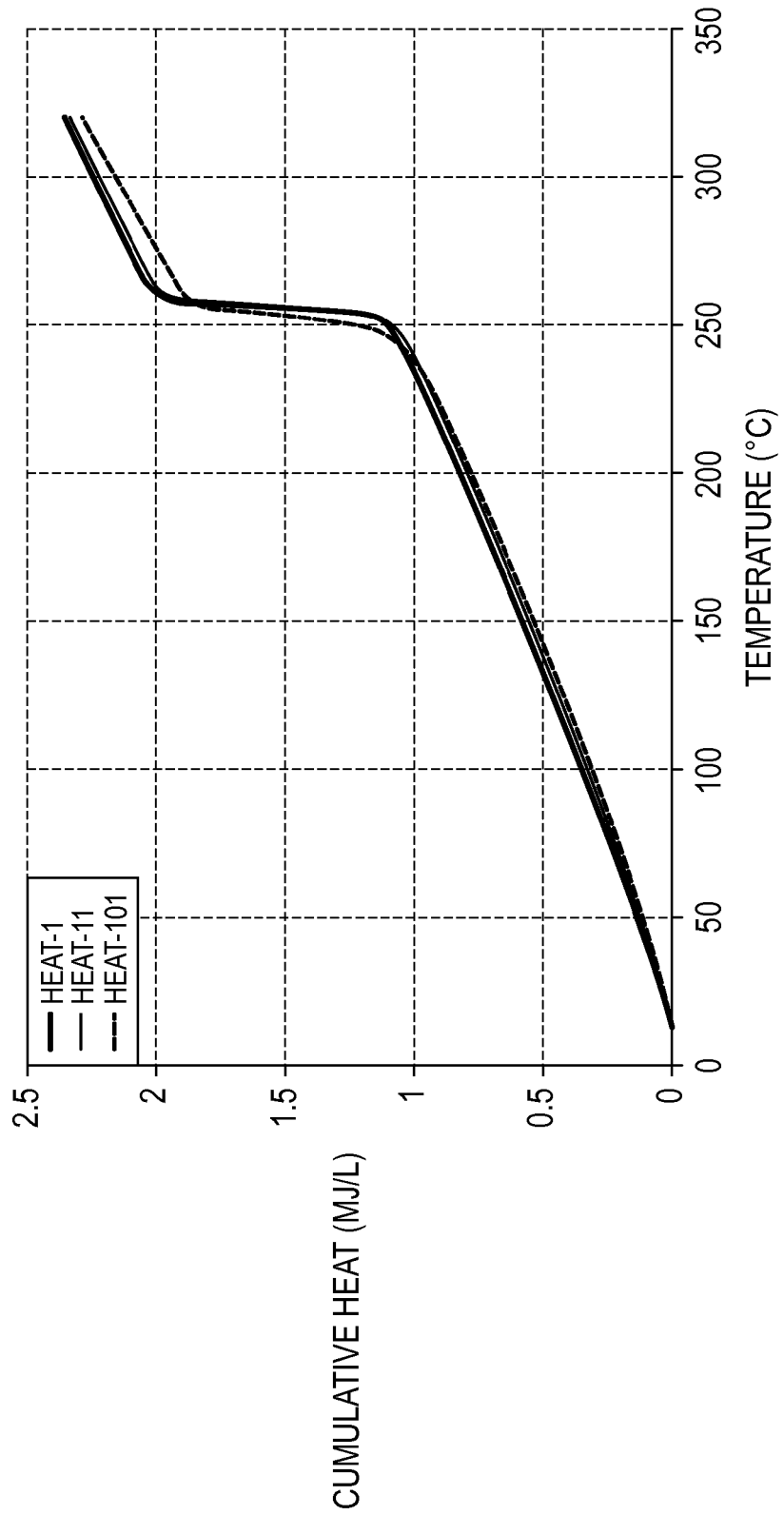
FIG. 5C plots cumulative heat as a function of temperature for an illustrative TESM.

An experimental thermal energy storage material, HT (i.e., Dow HT), is prepared having a $HSD_{300,80}$ greater than about 1.9 MJ/l and having a liquidus temperature of about 260° C. A 5 mg sample of HT is placed in an aluminum pan and covered. The covered pan is placed in a differential scanning calorimeter (DSC). The temperature is cycled between about 320° C. and about 20° C. The heat storage density from about 320° C. to about 20° C. a $HSD_{320,20,i}$ is measured for each thermal cycle i. Initially, HT has an $HSD_{320,20,0}$ of about 2.35 MJ/l. After 100 cycles, HT has an $HSD_{320,20,100}$ of about 2.28 MJ/l. The decrease in the $HSD_{32,20}$ is below about 3% after 100 cycles, and (as with other materials herein) is expected to maintain approximately that level for 500, or even 1000 or more cycles. FIG. 5A shows the DSC heating curves (heat capacity in J/g·° C. vs. temperature in ° C.) for the first cycle (i=0), the 51 st cycle (i=50) and the $101^{st}$ cycle (i=100) These curves have been vertically offset in the figure so that the peaks associated with the melting of the TESM can be easily differentiated for each heating cycle. The baseline of each curve illustrates that the heat capacity is nearly constant (constant rate of sensible heat increase with increasing temperature) and the peaks illustrates the latent heat of fusion. In FIG. 5A the absolute heat capacity is not shown, since the curves are shifted. FIG. 5B illustrates the $HSD_{320,20,i}$ of sample HT as a function of the thermal cycle, i. FIG. 5C illustrates the cumulative heat (combined sensible heat and latent heat of fusion) as a function of temperature for i=0, 10, 20, 30, 40, 50, 60, 70, 80, 90, 100, where the integration begins at a temperature of 20° C. The overlay of these curves illustrates the good stability of this material. The thermal properties (onset of melting in ° C., peak melting temperature in ° C., heat of fusion in J/g, onset of crystallization in ° C., and heat of crystallization in J/g) of the sample after i=0, 10, 20, 30, 40, 50, 60, 70, 80, 90, and 100 cycles is tabulated in TABLE 1 below.

TABLE 1

CYCLIC THERMODYNAMIC PROPERTIES OF SAMPLE HT

| Heat-Cool Cycle Number | Onset Melting Temperature, ° C. | Peak Melting Temperature, ° C. | Heat of Fusion, J/g | Crystallization Onset Temp., ° C. | Heat of Crystallization, J/g |
|---|---|---|---|---|---|
| 1 | 253 | 256 | 373 | * | * |
| 11 | 252 | 255 | 372 | * | * |
| 21 | 252 | 255 | 368 | * | * |
| 31 | 252 | 255 | 345 | 250 | 355 |
| 41 | 252 | 255 | 342 | 249 | 353 |
| 51 | 251 | 255 | 340 | 249 | 343 |
| 61 | 251 | 254 | 334 | 248 | 334 |
| 71 | 250 | 254 | 330 | 249 | 327 |
| 81 | 250 | 254 | 323 | 248 | 325 |
| 91 | 250 | 254 | 319 | 247 | 321 |
| 101 | 249 | 253 | 317 | 246 | 312 |

* Crystallization was so fast that sample self heated.

Figure 6A:
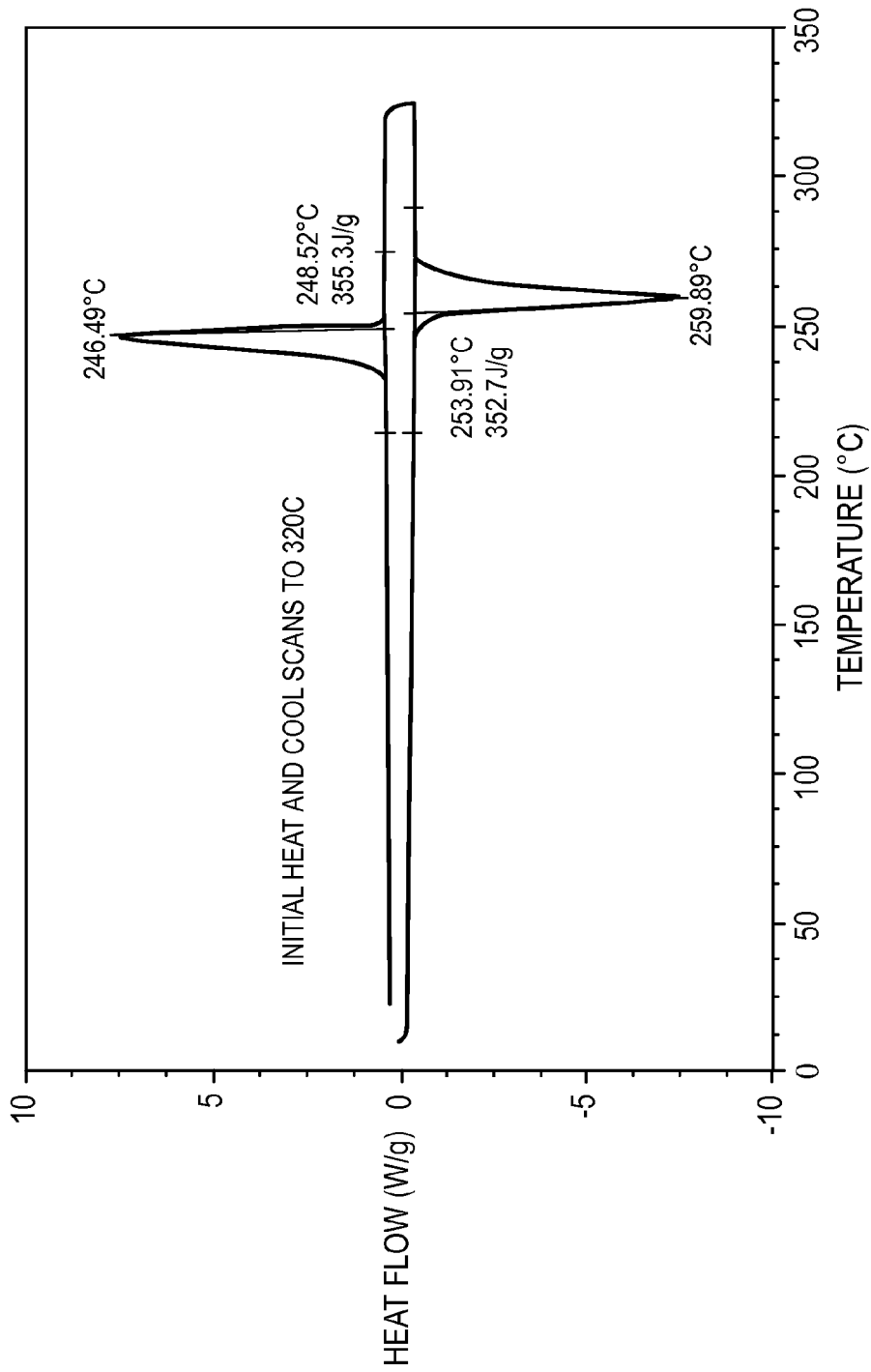
FIGS. 6A and 6B illustrate the thermal properties of a TESM before and after temperature cycles to about 500° C.
Figure 6B:
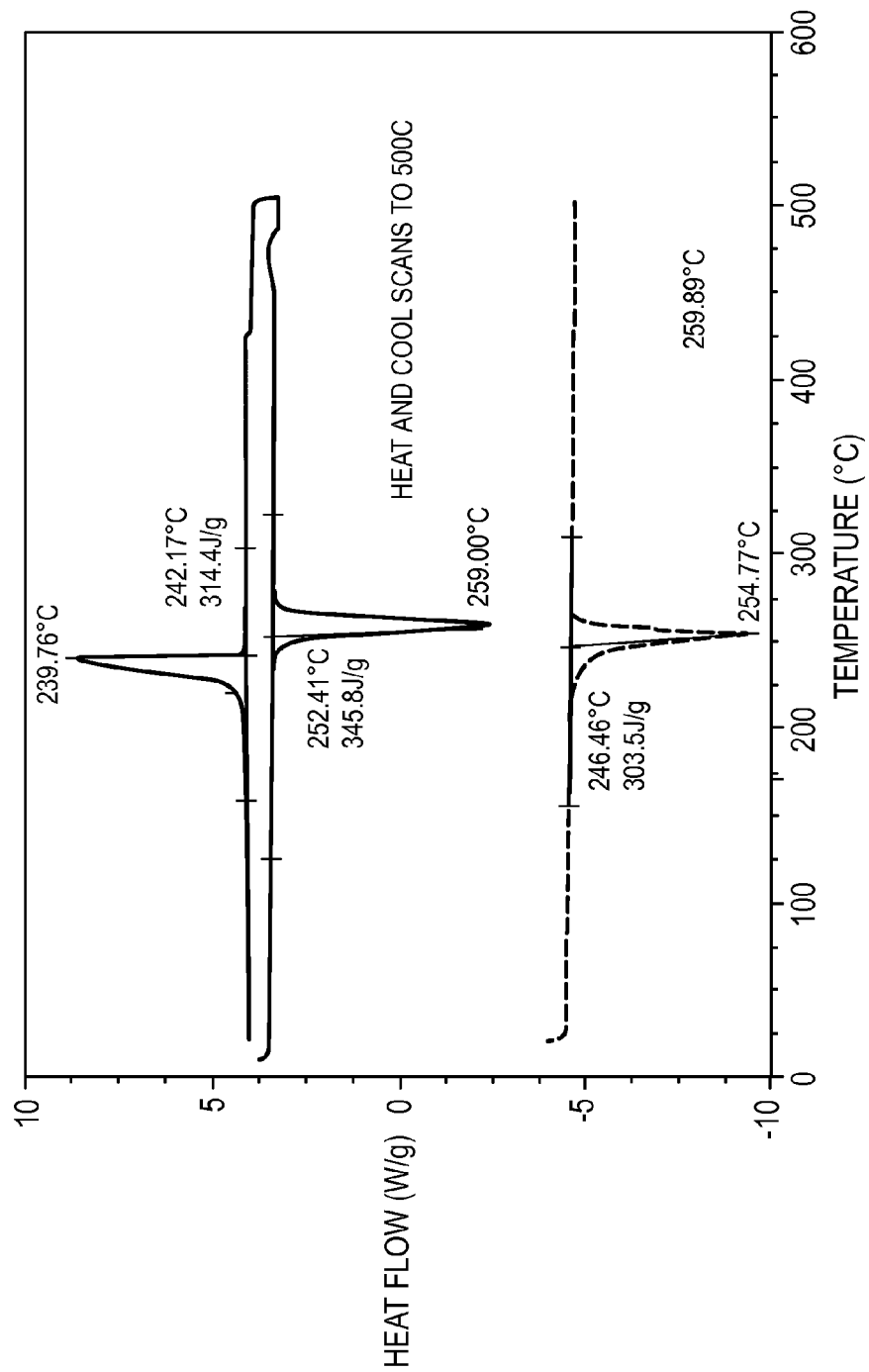

A fresh specimen of sample HT is heated in a differential scanning calorimeter (DSC). The sample is first heated from about 20° C. to about 320° C. at a rate of about 10° C./min and then cooled to 20° C. at a rate of about −10° C./min. A peak melting temperature of about 260° C. and a heat of fusion of about 352 J/g is measured during the first heat cycle. An onset of crystallization of about 249° C. and a heat of crystallization of about 355 J/g is measured during the first cooling cycle. The DSC heating and cooling curves for the first cycles are illustrated in FIG. 6A. The change in mass of the sample is about 2%. For the second cycle, the sample is heated to about 500° C. at a rate of 10° C./min and then cooled to 20° C. at a rate of about −10° C./min. The second cycle is characterized by a heat of fusion of about 346 J/g, a peak melting temperature of about 259° C., an onset of crystallization of about 242° C. and a heat of crystallization of about 314 J/g as illustrated in the top curves of FIG. 6B. The change in mass of the sample during the second cycle is about 2%. The specimen is then reheated in a third cycle to 500° C. and the heat of fusion is about 304 J/g and the peak melting temperature is about 255° C. as illustrated in the bottom curve of FIG. 6B.

Example 10

Figure 7A:
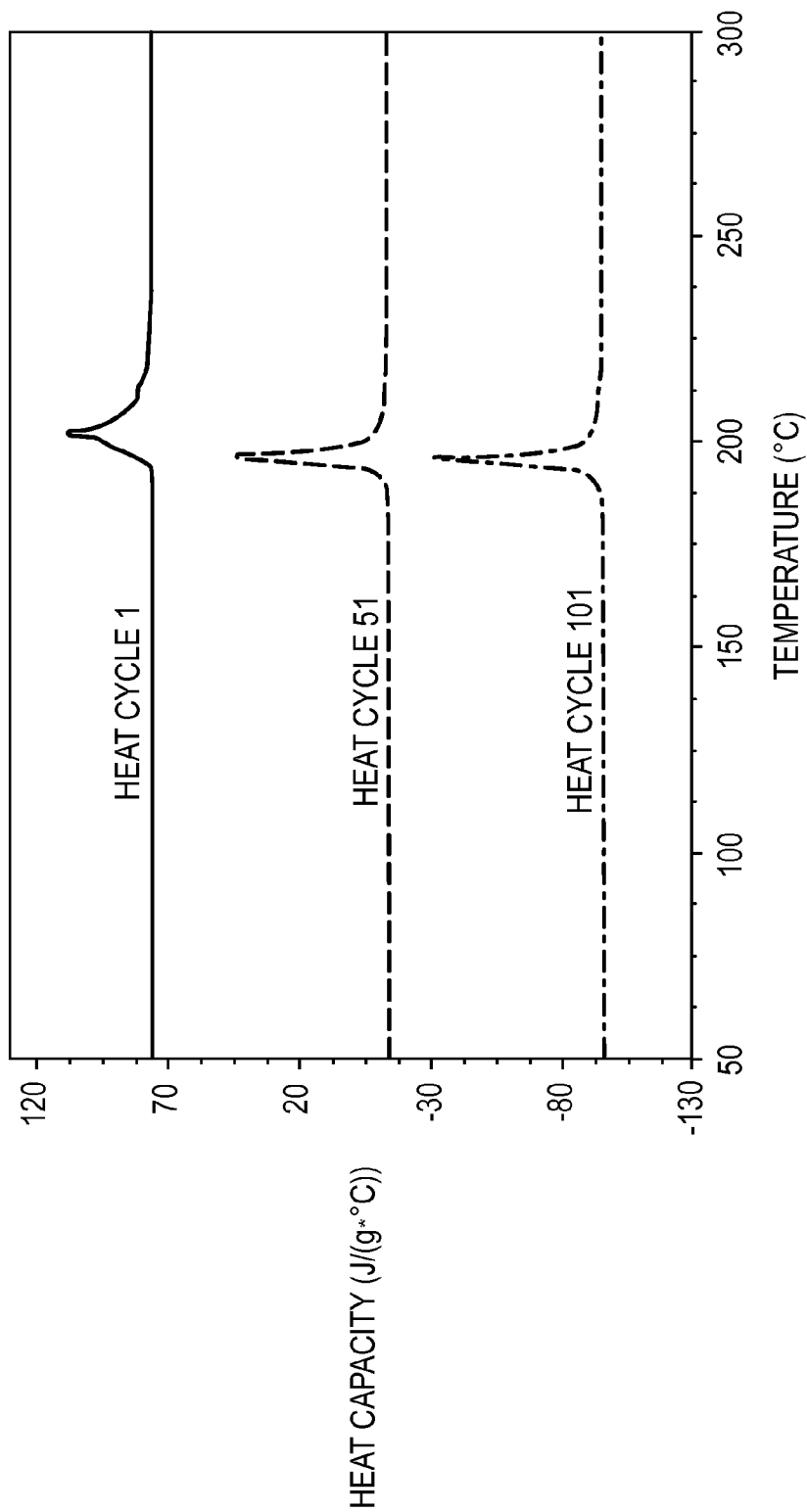
FIG. 7A illustrates crystallization curves of an illustrative TESM within the present teaching for its 1st, 51st and 101st cycles from about 40° C. to about 305° C.
Figure 7B:
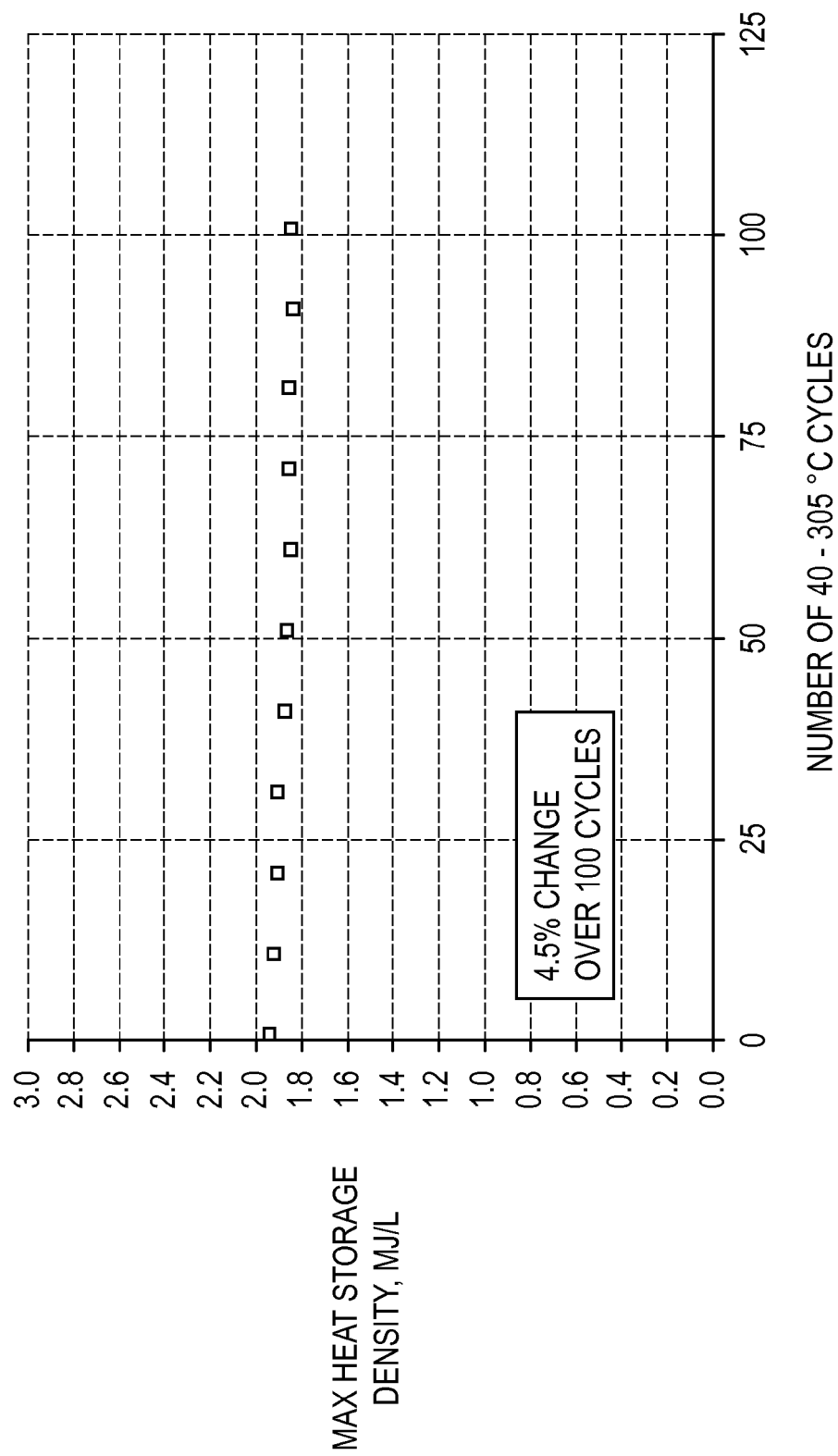
FIG. 7B illustrates a plot of the variation in the heat storage density from 305° C. to 40° C. for an illustrative TESM as a function of the number of cycles between 40° C. and 305° C.
Figure 7C:
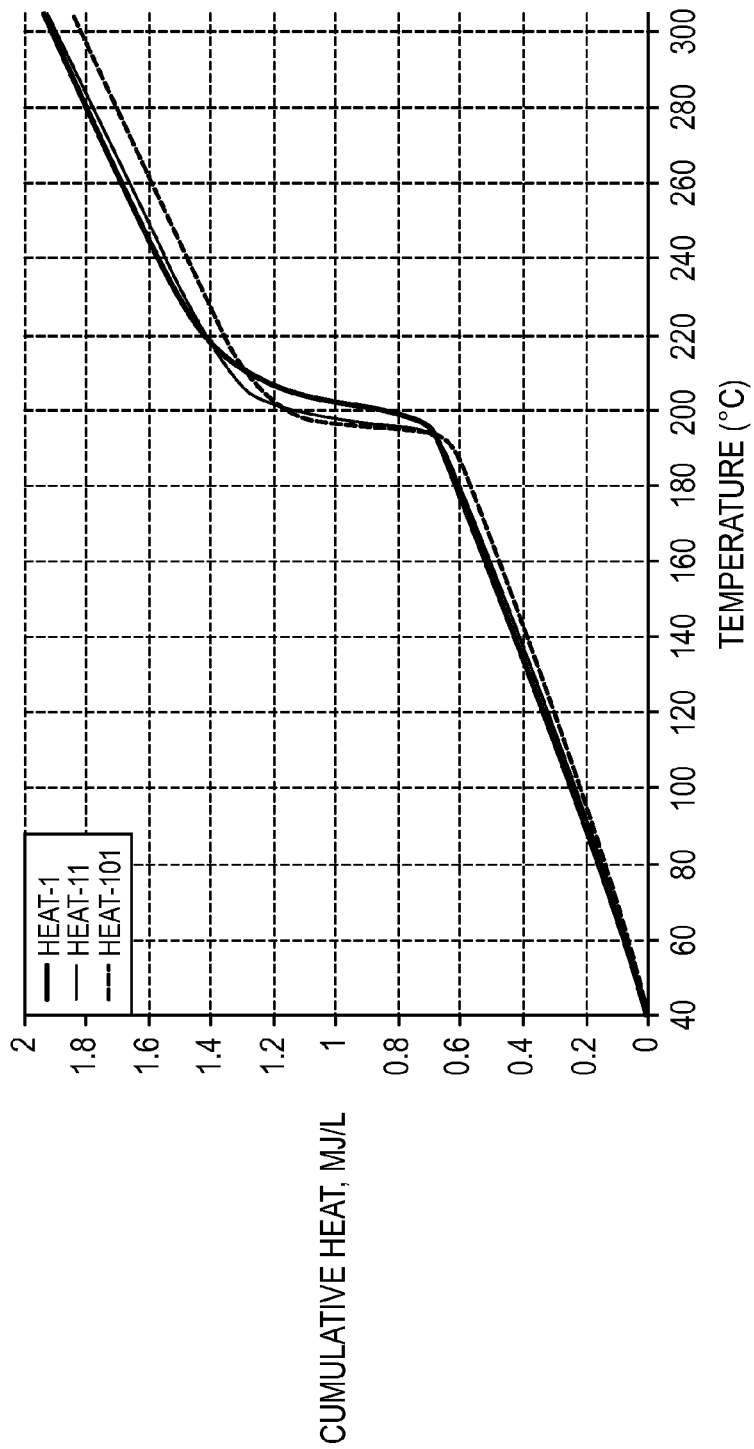
FIG. 7C plots cumulative heat as a function of temperature for an illustrative TESM.

An experimental thermal energy storage material, MT1 (i.e., Dow MT1), is prepared having a $HSD_{300,80}$) greater than about 1.7 MJ/l and having a liquidus temperature of about 210° C. A 5 mg sample of MT1 is placed in an aluminum pan and covered. The covered pan is placed in a differential scanning calorimeter. The temperature is cycled between about 305° C. and about 40° C. The heat storage density from about 305° C. to about 40° C. a $HSD_{305,40,i}$ is measured for each thermal cycle i. Initially, MT1 has an $HSD_{305,40,0}$ of about 1.94 MJ/l. After 100 cycles, MT1 has an $HSD_{305,40,100}$ of about 1.85 MJ/l. The decrease in the $HSD_{305,40,100}$ is below about 5% of $HSD_{305,40,0}$. FIG. 7A shows the DSC heating curves (heat capacity in J/g·° C. vs. temperature in ° C.) for the first cycle (i=0), the $51^{st}$ cycle (i=50) and the $101^{st}$ cycle (i=100). These curves have been vertically offset in the figure so that the peaks associated with the melting of the TESM can be easily differentiated for each heating cycle. The baseline of each curve illustrates that the heat capacity is nearly constant (constant rate of sensible heat increase with increasing temperature) and the peaks illustrates the latent heat of fusion. In FIG. 7A the absolute heat capacity is not shown, since the curves are shifted. FIG. 7B illustrates the $HSD_{305,40,i}$ (in units of MJ/liter) of sample MT1 as a function of the thermal cycle, i. FIG. 7C illustrates the cumulative heat (combined sensible heat and latent heat of fusion) as a function of temperature for i=0, 10, 20, 30, 40, 50, 60, 70, 80, 90, 100, where the integration begins at a temperature of 40° C. The thermal properties (onset of melting in ° C., peak melting temperature in ° C., heat of fusion in J/g, onset of crystallization in ° C., and heat of crystallization in J/g) of the sample after i=0, 10, 20, 30, 40, 50, 60, 70, 80, 90, and 100 cycles is tabulated in TABLE 2 below.

TABLE 2

CYCLIC THERMODYNAMIC PROPERTIES OF SAMPLE MT1

| Heat-Cool Cycle Number | Onset Melting Temperature, ° C. | Peak Melting Temperature, ° C. | Heat of Fusion, J/g | Crystallization Onset Temp., ° C. | Heat of Crystallization, J/g |
|---|---|---|---|---|---|
| 1 | 200 | 202 | 284 | 204 | 259 |
| 11 | 194 | 196 | 267 | 197 | 241 |
| 21 | 194 | 196 | 264 | 206 | 182 |
| 31 | 194 | 196 | 263 | 193 | 135 |
| 41 | 194 | 196 | 262 | 205 | 208 |
| 51 | 194 | 196 | 261 | 198 | 211 |
| 61 | 194 | 196 | 260 | 196 | 235 |
| 71 | 194 | 196 | 258 | 196 | 236 |
| 81 | 194 | 196 | 258 | 197 | 234 |
| 91 | 194 | 196 | 256 | 196 | 234 |
| 101 | 194 | 196 | 255 | 197 | 231 |

Figure 8A:
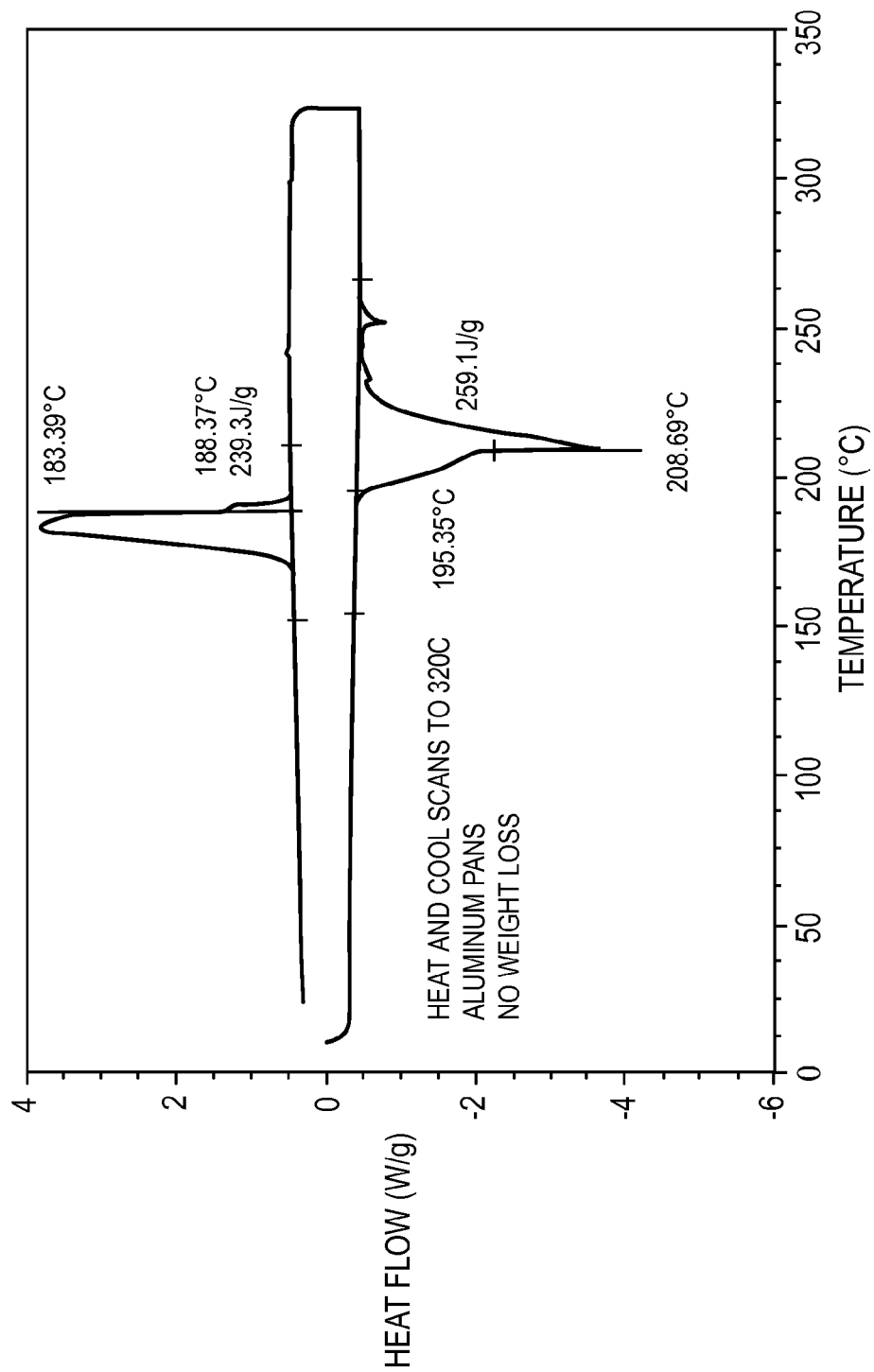
FIGS. 8A and 8B illustrate the thermal properties of a TESM before and after temperature cycles to about 500° C.
Figure 8B:
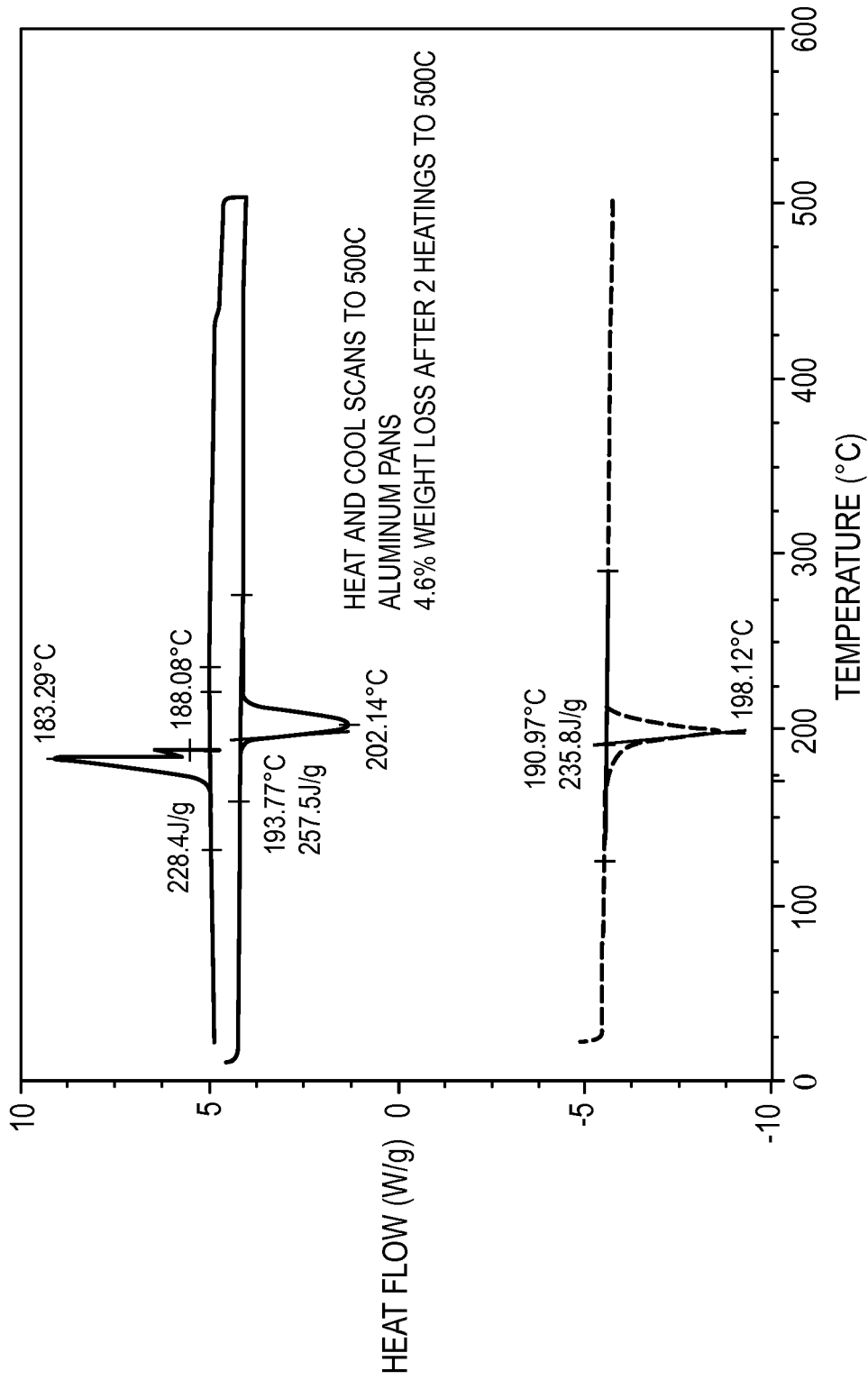

A fresh specimen of sample MT1 is heated in a differential scanning calorimeter (DSC). The sample is first heated from about 20° C. to about 320° C. at a rate of about 10° C./min and then cooled to 20° C. at a rate of about −10° C./min. A peak melting temperature of about 205° C. and a heat of fusion of about 259 J/g is measured during the first heat cycle. An onset of crystallization of about 188° C. and a heat of crystallization of about 239 J/g is measured during the first cooling cycle. The DSC heating and cooling curves for the first cycles are illustrated in FIG. 8A. The change in mass of the sample is about 0%. For the second cycle, the sample is heated to about 500° C. at a rate of 10° C./min and then cooled to 20° C. at a rate of about −10° C./min. The second cycle is characterized by a heat of fusion of about 258 J/g, a peak melting temperature of about 202° C., an onset of crystallization of about 188° C. and a heat of crystallization of about 228 J/g as illustrated in the top curves of FIG. 8B. The change in mass of the sample during the second cycle is about 4.6%. The specimen is then reheated in a third cycle to 500° C. and the heat of fusion is about 236 J/g and the peak melting temperature is about 198° C. as illustrated in the bottom curve of FIG. 8B.

Example 11

Figure 9A:
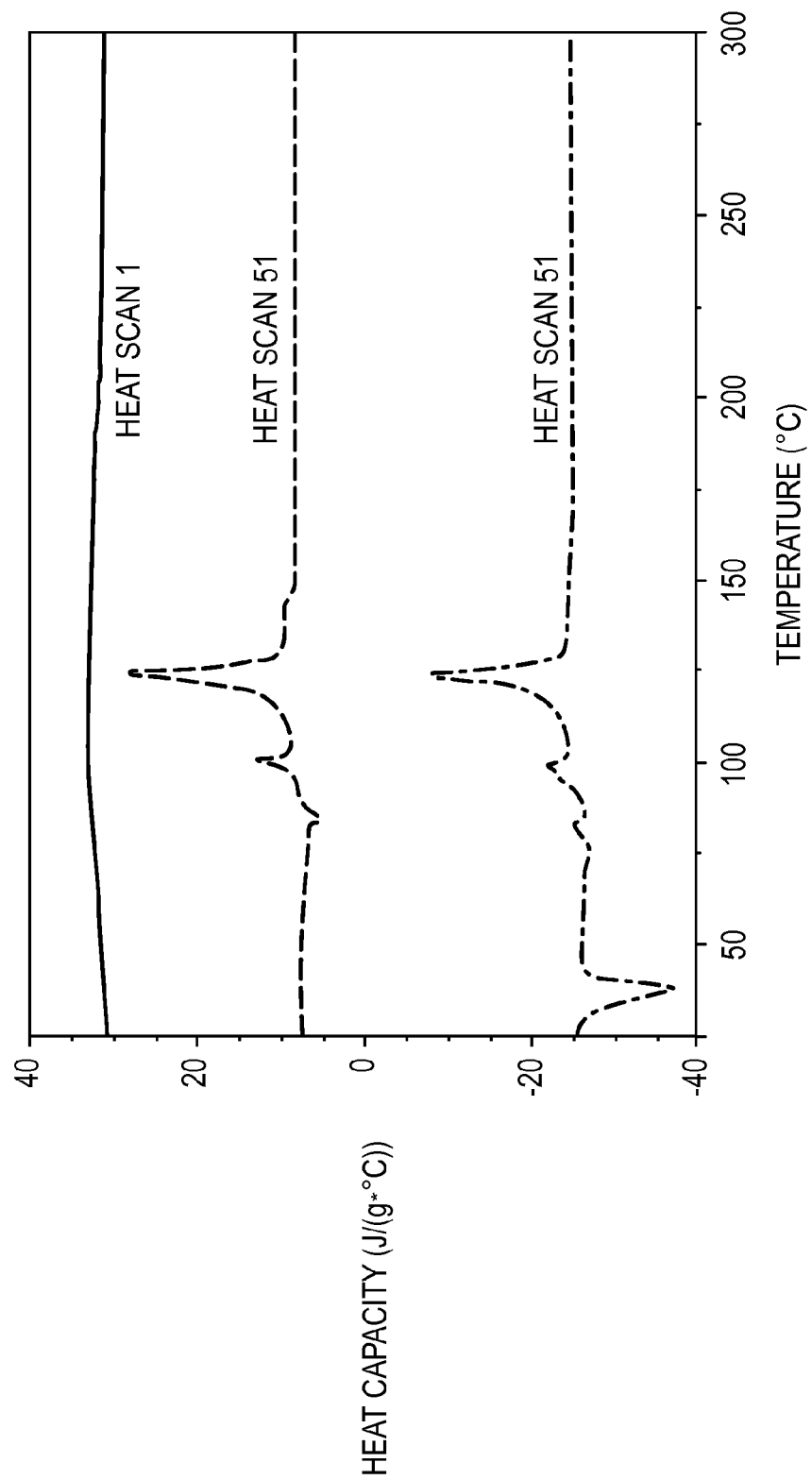
FIG. 9A illustrates crystallization curves of an illustrative TESM within the present teaching for its 1st, 51st and 101st cycles from about 25° C. to about 200° C.
Figure 9B:
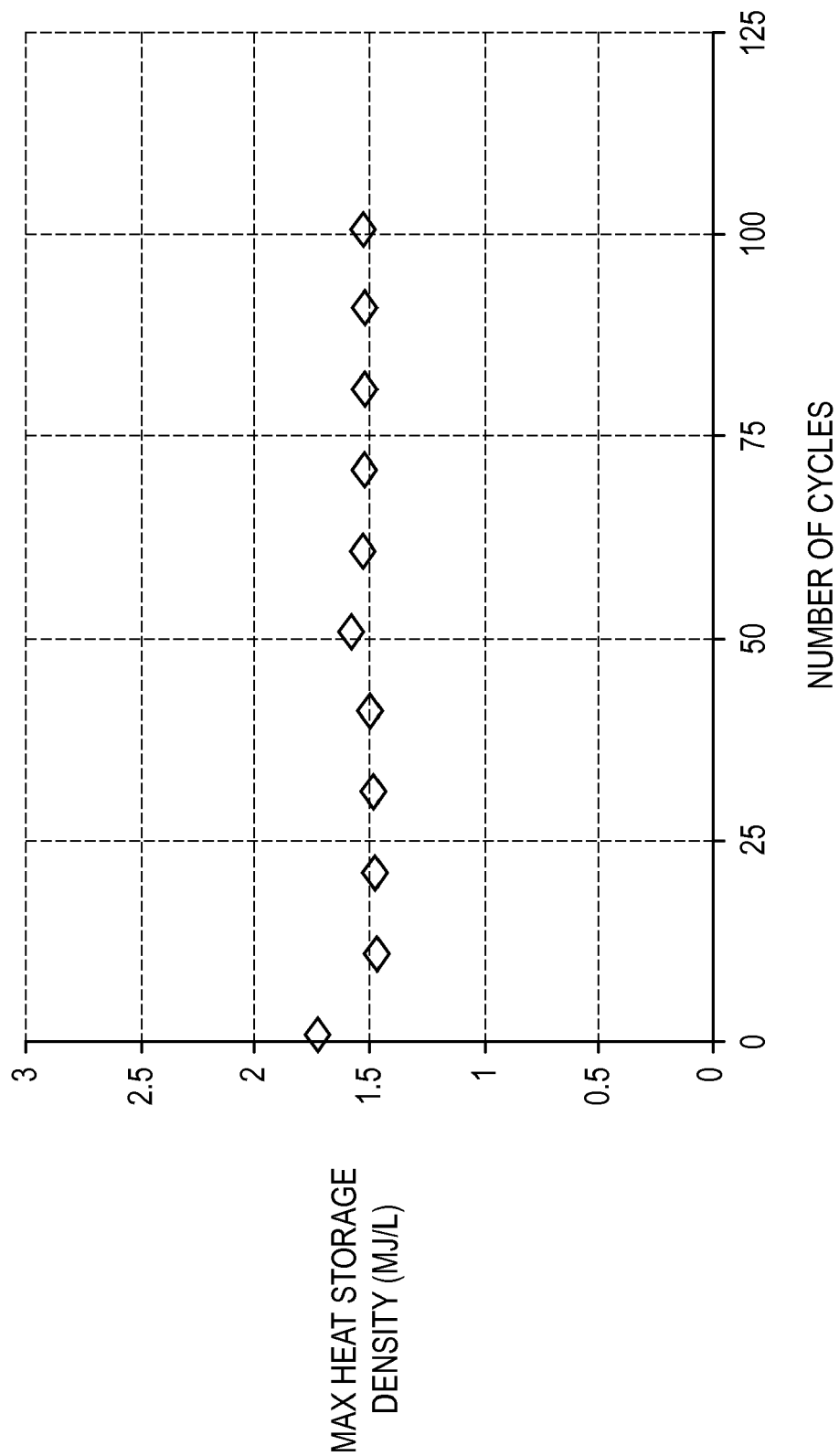
FIG. 9B illustrates a plot of the variation in the heat storage density from 200° C. to 25° C. for an illustrative TESM as a function of the number of cycles between 25° C. and 200° C.
Figure 9C:
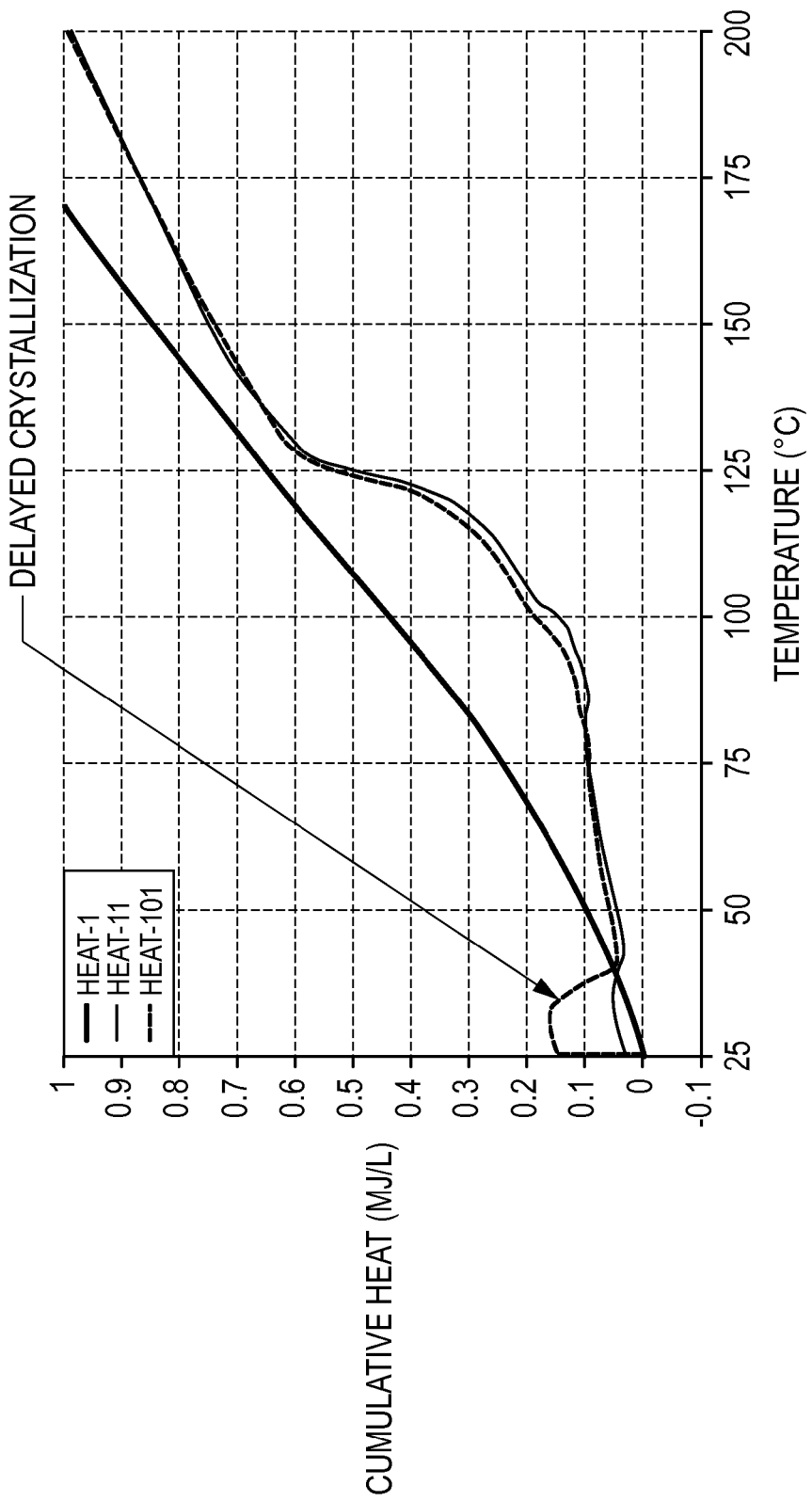
FIG. 9C plots cumulative heat as a function of temperature for an illustrative TESM.

An experimental thermal energy storage material, LT (i.e., Dow LT), is prepared having a $HSD_{200,50}$) greater than about 0.90 MJ/l and having a liquidus temperature of about 125° C. A 5 mg sample of LT is placed in an aluminum pan and covered. The covered pan is placed in a differential scanning calorimeter. The temperature is cycled between about 200° C. and about 25° C. The heat storage density from about 200° C. to about 25° C. a $HSD_{200,25,i}$ is measured for each thermal cycle i. Initially, LT has an $HSD_{200,50,0}$ of about 1.7 MJ/l. After 100 cycles, LT has an $HSD_{200,25,100}$ of about 15 MJ/l. The decrease in the $HSD_{200,25,100}$ is at most about 18% of $HSD_{305,40,0}$. FIG. 9A shows the DSC heating curves (heat capacity in J/g·° C. vs. temperature in ° C.) for the first cycle (i=0), the $51^{st}$ cycle (i=50) and the $101^{st}$ cycle (i=100). These curves have been vertically offset in the figure so that the peaks associated with the melting of the TESM can be easily differentiated for each heating cycle. The baseline of each curve illustrates that the heat capacity is nearly constant (constant rate of sensible heat increase with increasing temperature) and the peaks illustrates the latent heat of fusion. In FIG. 9A the absolute heat capacity is not shown, since the curves are shifted. FIG. 9B illustrates the $HSD_{200,25,i}$ (in units of MJ/liter) of LT as a function of the thermal cycle, i. FIG. 9C the cumulative heat (combined sensible heat and latent heat of fusion) as a function of temperature for i=0, 10, 20, 30, 40, 50, 60, 70, 80, 90, 100, where the integration begins at a temperature of 25° C. The thermal properties (onset of melting in ° C., peak melting temperature in ° C., heat of fusion in J/g, onset of crystallization in ° C., and heat of crystallization in J/g) of the sample after i=0, 10, 20, 30, 40, 50, 60, 70, 80, 90, and 100 cycles is tabulated in TABLE 3 below.

TABLE 3

CYCLIC THERMODYNAMIC PROPERTIES OF SAMPLE LT

| Heat-Cool Cycle Number | Onset Melting Temperature, ° C. | Peak Melting Temperature, ° C. | Heat of Fusion, J/g | Crystallization Onset Temp., ° C. | Heat of Crystallization, J/g |
|---|---|---|---|---|---|
| 1 | 41 | 104 | 182 | 52 | 45 |
| 11 | 97 | 125 | 176 | 47 | 55 |
| 21 | 97 | 125 | 171 | 38 | 5 |
| 31 | 95 | 125 | 172 | 42 | 8 |
| 41 | 96 | 125 | 168 | 29 | 7 |
| 51 | 97 | 125 | 148 | 38 | 5 |
| 61 | 93 | 125 | 168 | 39 | 4 |
| 71 | 93 | 125 | 166 | 32 | 1 |
| 81 | 92 | 125 | 166 | 39 | 3 |
| 91 | 92 | 125 | 164 | 43 | 4 |
| 101 | 94 | 125 | 150 | 59 | 32 |

Example 12

Figure 10:
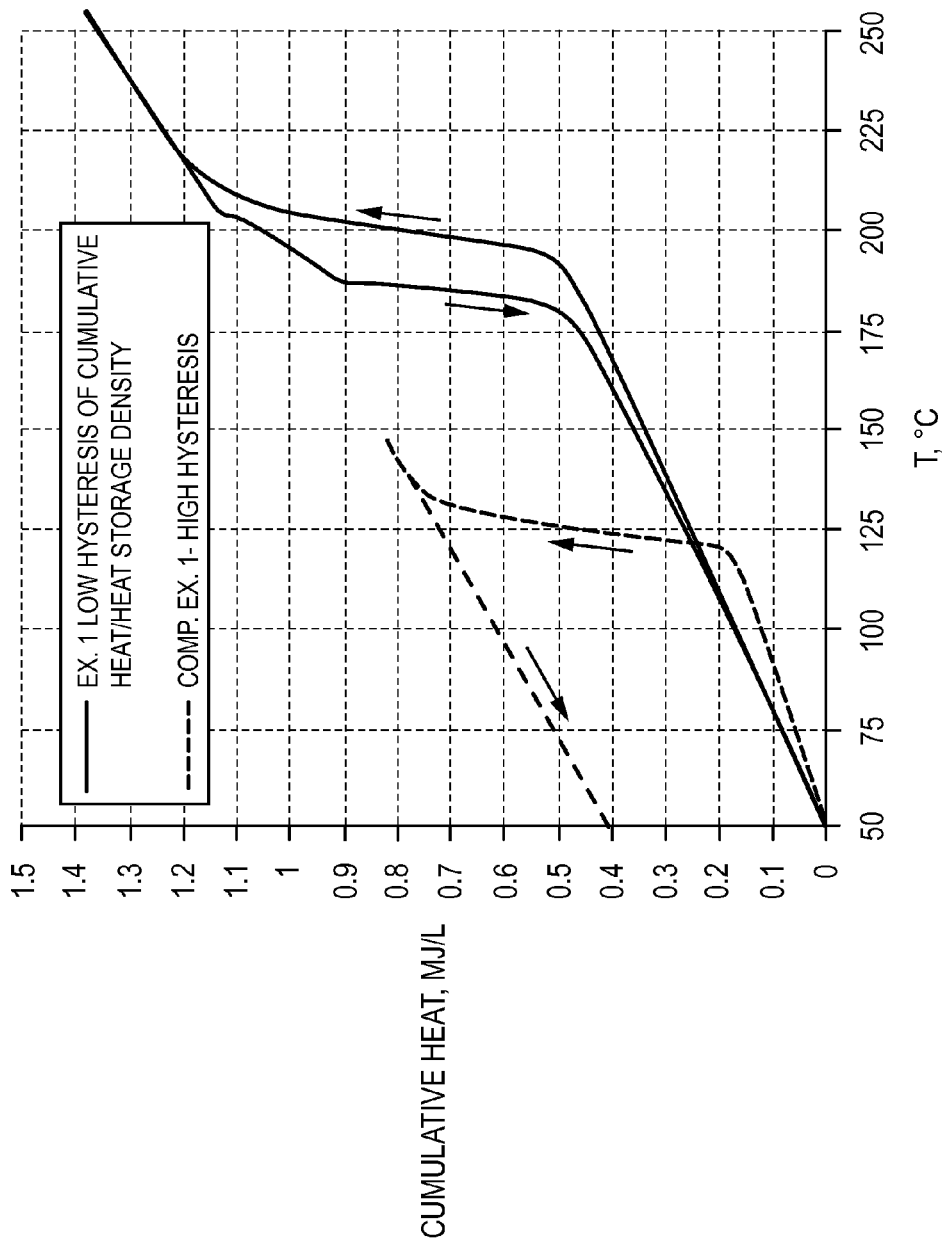
FIG. 10 illustrates the hysteresis of the thermal storage density for a TESM material having low hysteresis and a TESM having high hysteresis.

A sample of a TESM of the present invention (EX. 1) and sample of a comparative TESM (Comp. Ex. 1) are studied by differential scanning calorimetry. Each sample is heated above its liquidus temperature at a rate of 10° C./min and then cooled at a rate of −10° C./min. The heating and cooling curves are illustrated in FIG. 10. The Comp. EX. 1 sample contains erythritol which is an organic TESM. The comparative example 1 has a high hysteresis and only releases about half of its stored thermal energy upon cooling. The sample designated as EX. 1 is a TESM of the present invention and has a low hysteresis with most of the stored heat recovered upon cooling. The melting and crystallization temperatures of Ex. 1 differ by less than about 20° C.

Example 13

Figure 11A:
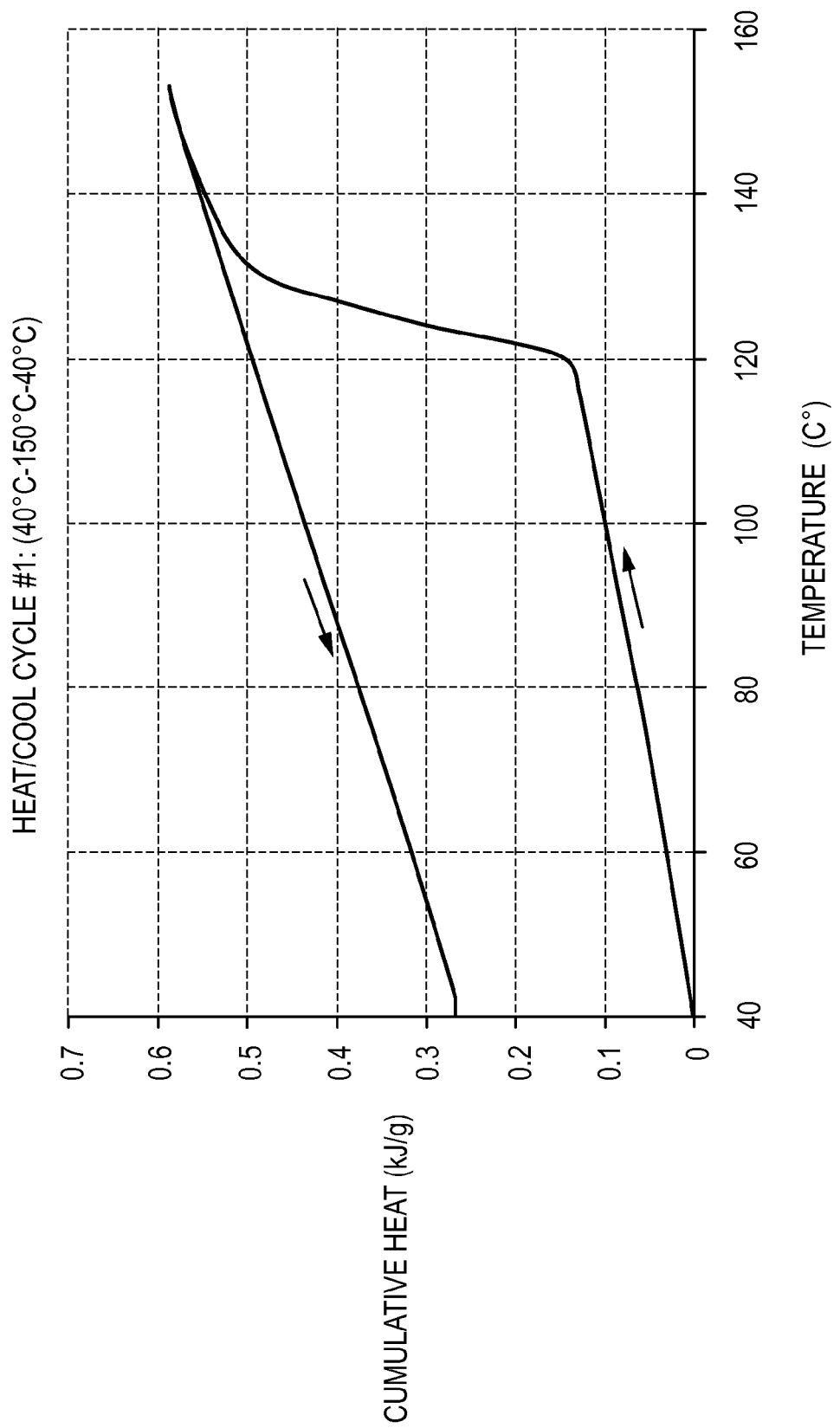
FIGS. 11A, 11B, and 11C illustrates the melting and crystallization characteristics of erythritol during the first, second and third heating and cooling cycles, respectively.
Figure 11B:
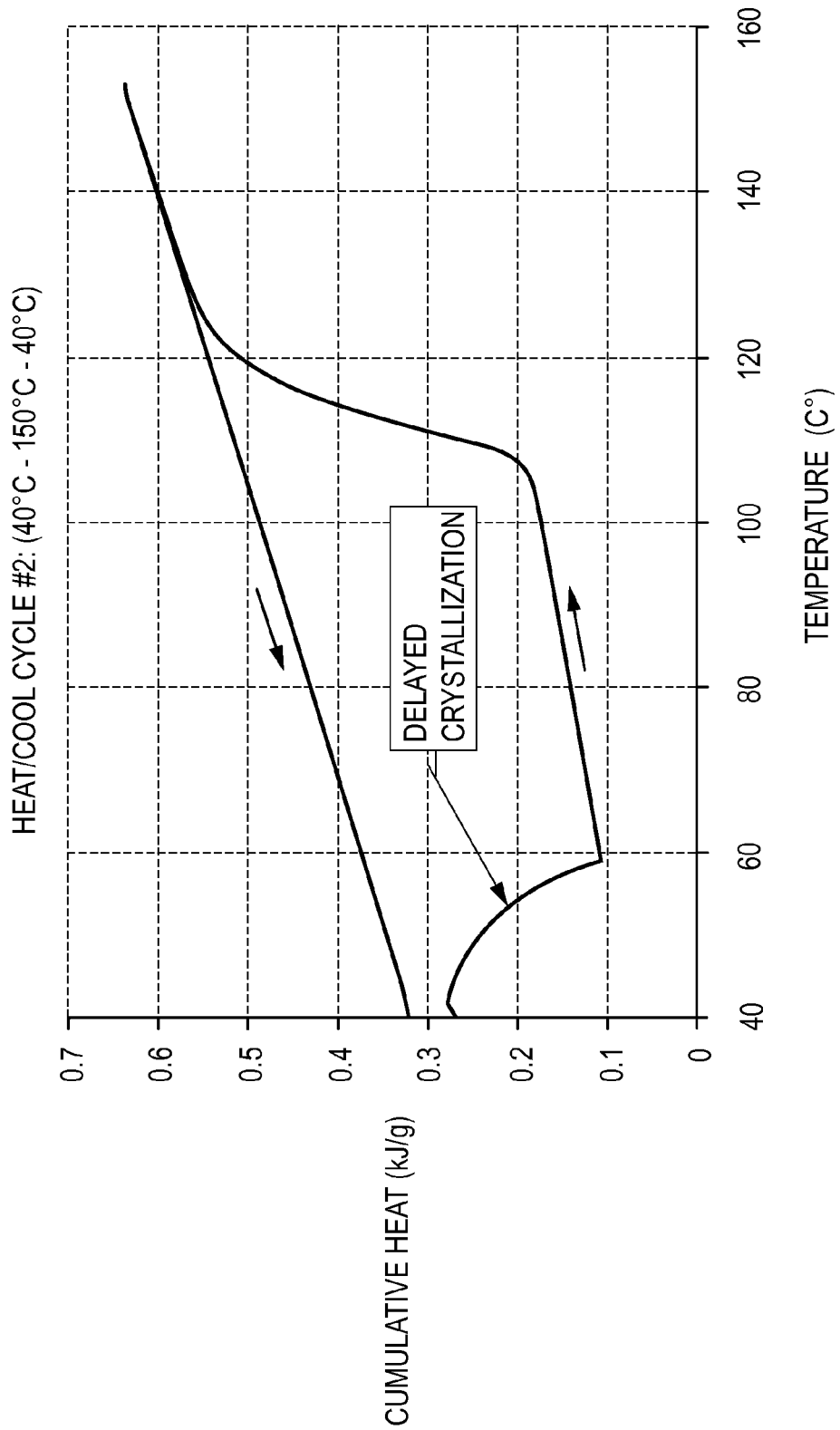
Figure 11C:
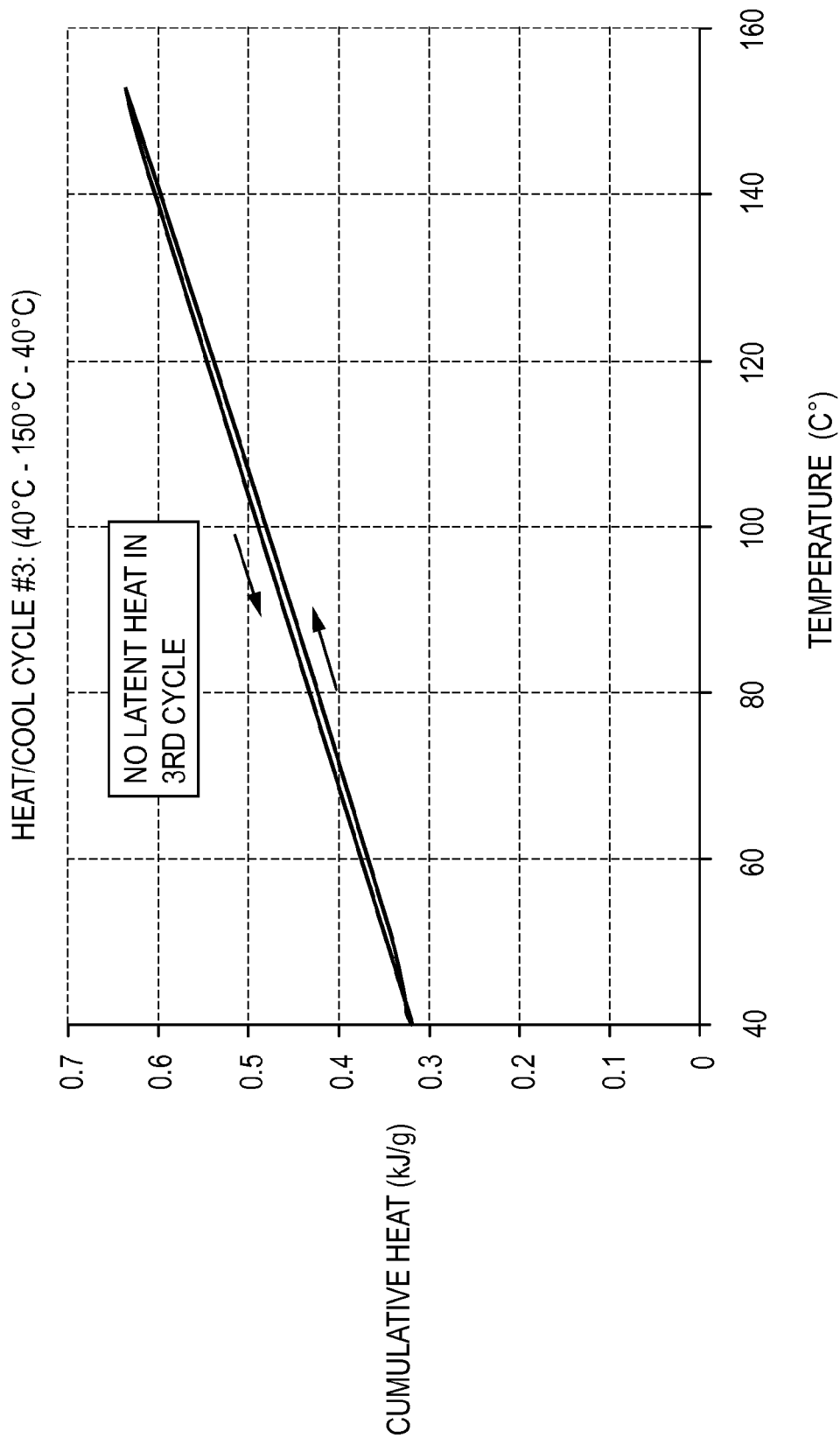

Erythritol Comparison: By way of comparison, FIG. 11 further illustrates the heating and cooling behavior of erythritol. During the first heat cycle, the erythritol melts. Upon cooling at 10° C., there is little or no latent heat of fusion, and the majority (or all) of the heat recovered is sensible heat. The majority of the crystallization occurs does not occur until the second heating cycle, when the material crystallizes as the sample is heated and releases heat. Again, during the second cooling cycle, there is little or no latent heat of fusion, and the majority (or all) of the heat recovered is sensible heat. In the third heating cycle, crystallization is not observed. The heating and cooling curves only show sensible heat.

Table 4 below illustrates selected physical and thermal characteristics of various TESMs including a high temperature TESM which has a phase transition at a temperature below about 300° C.; a medium temperature TESM which has a phase transition at a temperature below about 250° C.; and a low temperature TESM which may has a phase transition at a temperature below about 200° C. Table 4 also lists properties of an organic TESM, erythritol, and a hydrated salt, barium hydroxide octahydrate.

TABLE 4

THERMODYNAMIC PROPERTIES OF THERMAL ENERGY STORAGE MATERIALS

| | Material | | | | |
|---|---|---|---|---|---|
| | Dow HT (High Temp) | Dow MT1 (Medium Temp) | Dow LT (Low Temp) | Erythritol | Barium Hydroxide Octahydrate |
| Composition | LiNO$_3$ | LiNO$_3$ NaNO$_3$ | *Cations: Li, Na, K Anions: NO$_3$, NO$_2$ | C$_4$H$_{10}$O$_4$ | Ba(OH)$_2$·8H$_2$O |
| Density (g/cm3) | 2.38 | 2.32 | 2.27 | 1.45 | 2.18 |
| Weight of 1.65 liters (kg) | 3.9 | 3.8 | 3.7 | 2.4 | 3.6 |
| Temperature range, ° C. | 50-300 | 50-250 | 50-200 | 50-150 | 50-105 |
| Sensible Heat (MJ/L) | 1.10 | 0.5 | 0.63 | 0.29 | 0.23 |
| Center of Melting Range, ° C. | 255 | 200 | 120 | 125 | 80 |
| Latent Heat, MJ/L | 0.92 | 0.61 | 0.48 | 0.53 | 0.65 |

Dow LT is a mixture of LiNO$_3$, NaNO$_2$, and KNO$_2$ and crystallized from the melt.

Examples 14-43

Examples 14-43 Illustrate Additional TESM Compositions

| | 14 | 15 | 16 | 17 | 18 | 19 | 20 | 21 | 22 | 23 |
|---|---|---|---|---|---|---|---|---|---|---|
| LiNO$_3$, mole % | 83.7% | 79.8% | 71.1% | 59.0% | 60.2% | 64.5% | 80.6% | 68.4% | 100.0% | 60.8% |
| LiF, mole % | 0.0% | 0.0% | 28.9% | 10.9% | 19.7% | 7.5% | 13.7% | 10.6% | 0.0% | 24.0% |
| NaF, mole % | 11.7% | 20.2% | 0.0% | 20.1% | 9.4% | 23.6% | 0.0% | 10.3% | 0.0% | 15.2% |
| MgF$_2$, mole % | 4.5% | 0.0% | 0.0% | 10.0% | 10.7% | 4.5% | 5.8% | 10.7% | 0.0% | 0.0% |
| Density, g/cm$^3$ | 2.42 | 2.4 | 2.41 | 2.48 | 2.48 | 2.44 | 2.43 | 2.47 | 2.38 | 2.43 |
| Cumulative Heat (300 to 80° C.), J/g | 744 | 743 | 768 | 622 | 680 | 639 | 742 | 672 | 799 | 637 |
| HSD$_{300,80}$, MJ/L | 1.8 | 1.78 | 1.85 | 1.54 | 1.69 | 1.56 | 1.8 | 1.66 | 1.9 | 1.55 |
| Melt Temp(s), ° C. | 196 238 | 197 228 | 256 | 199 | 192 244 | 199 253 | 255 | 196 236 | 260 | 198 223 253 |

-continued

| Heat(s) of Fusion, J/g | 86.5 200.7 | 144.6 134.6 | 314.8 | 193.8 | 33.1 220.0 | 207.7 2.15 | 321 | 80.7 173.2 | 350.7 | 127.5 83.3 8.4 |

| | 24 | 25 | 26 | 27 | 28 | 29 | 30 | 31 | 32 | 33 |
|---|---|---|---|---|---|---|---|---|---|---|
| LiNO$_3$, mole % | 63.1% | 75.4% | 85.4% | 71.9% | 62.9% | 79.9% | 58.6% | 95.2% | 70.5% | 69.0% |
| LiF, mole % | 32.4% | 0.0% | 14.6% | 14.8% | 29.1% | 0.0% | 31.0% | 0.0% | 10.7% | 0.0% |
| NaF, mole % | 4.5% | 19.6% | 0.0% | 0.0% | 3.9% | 10.4% | 0.0% | 0.0% | 18.8% | 20.9% |
| MgF$_2$, mole % | 0.0% | 4.9% | 0.0% | 13.3% | 4.1% | 9.7% | 10.4% | 4.8% | 0.0% | 10.2% |
| Density, g/cm$^3$ | 2.42 | 2.43 | 2.39 | 2.48 | 2.45 | 2.45 | 2.49 | 2.41 | 2.41 | 2.46 |
| Cumulative Heat (300 to 80° C.) J/g | 720 | 682 | 775 | 709 | 705 | 729 | 670 | 749 | 698 | 647 |
| HSD$_{300,80}$, MJ/L | 1.74 | 1.66 | 1.85 | 1.76 | 1.73 | 1.78 | 1.67 | 1.8 | 1.68 | 1.59 |
| Melt Temp(s), ° C. | 193 245 253 | 199 222 253 | 254 | 253 | 195 247 | 196 243 253 | 255 | 260 | 198 221 254 | 201 253 |
| Heat(s) of Fusion, J/g | 31.5 228.7 9.0 | 157 80 4 | 323 | 282 | 26.8 234 | 57.7 225.5 6.9 | 253.8 | 337.1 | 161.4 80.6 6.5 | 219.6 2.5 |

| | 34 | 35 | 36 | 37 | 38 | 39 | 40 | 41 | 42 | 43 |
|---|---|---|---|---|---|---|---|---|---|---|
| LiNO$_3$, mole % | 89.2% | 58.9% | 59.7% | 72.7% | 59.8% | 64.2% | 60.5% | 90.2% | 60.1% | 64.7% |
| LiF, mole % | 0.0% | 29.8% | 20.1% | 16.1% | 14.3% | 30.5% | 30.0% | 0.0% | 22.7% | 4.6% |
| NaF, mole % | 10.8% | 5.0% | 20.2% | 11.2% | 20.8% | 0.0% | 9.4% | 0.0% | 12.6% | 19.4% |
| MgF$_2$, mole % | 0.0% | 6.3% | 0.0% | 0.0% | 5.1% | 5.3% | 0.0% | 9.8% | 4.6% | 11.3% |
| Density, g/cm$^3$ | 2.39 | 2.46 | 2.43 | 2.41 | 2.46 | 2.45 | 2.43 | 2.43 | 2.45 | 2.48 |
| Cumulative Heat (300 to 80° C.), J/g | 750 | 687 | 618 | 717 | 615 | 717 | 652 | 753 | 671 | 639 |
| HSD$_{300,80}$, MJ/L | 1.79 | 1.69 | 1.5 | 1.73 | 1.51 | 1.76 | 1.58 | 1.83 | 1.65 | 1.58 |
| Melt Temp(s), ° C. | 196 239 254 | 195 238 254 | 199 253 | 195 238 | 194 | 256 | 196 234 254 | 262 | 197 228 254 | 198 253 |
| Heat(s) of Fusion, J/g | 76.5 217.9 8.0 | 39.3 198.9 8.9 | 197.3 4.2 5 | 74 193 | 199 | 290 | 85 154 4 | 320 | 108 114 6 | 212 5 |

Examples 44-46

A sample of metal foil having a thickness of about 20 to 100 μm and a total surface area of about 60 cm$^2$ is weighed and then placed in a crucible made of the same material as the metal foil. The crucible is filled with the heat storage material of Example 7 (MT1) such that the TESM contacts the entire surface of the metal foil. The crucible is sealed and placed in an autoclave at about 300° C. for 45 days. After 45 days, the crucible is cooled to room temperature and the weight change of the metal foil is determined. The test is repeated using two specimens of each metal. Example 44 is an aluminum foil (Al 1100) having an initial thickness of about 75 μm thick. After 45 days in the autoclave the aluminum has an average weight gain of about 8.7 mg. Example 45 is a stainless steel (304 type) having an initial thickness of about 125 μm. After 45 days in the autoclave the 304 stainless steel has an average weight gain of about 0.55 mg. Example 46 is a stainless steel (316 type) having an initial thickness of about 125 μm. After 45 days in the autoclave the 316 stainless steel has an average weight gain of about 0.45 mg.

| Sample Name | Foil Material | Duration (Days) | Initial Weight (g) | Final Weight (g) | Weight Gain (mg) |
|---|---|---|---|---|---|
| EX. 44 | Al1100 | 45 | 0.6159 | 0.6253 | 9.4 |
| EX. 44 | Al1100 | 45 | 0.5710 | 0.5790 | 8.0 |
| EX. 45 | SS304 | 45 | 2.9059 | 2.9064 | 0.5 |
| EX. 45 | SS304 | 45 | 2.8621 | 2.8627 | 0.6 |
| EX. 46 | SS316 | 45 | 3.0077 | 3.0081 | 0.4 |
| EX. 46 | SS316 | 45 | 2.9542 | 2.9547 | 0.5 |

The following discussion applies to the teachings as a whole, and not merely the teachings of the examples. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. Unless otherwise stated, references to containers contemplate interim storage containers as well as permanent encapsulation structures.

The disclosures of all articles and references, including patent applications and publications, are incorporated by reference for all purposes. References to an The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. Likewise, any reference to "first" or "second" items is not intended to foreclose additional items (e.g., third, fourth, or more items), or to indicate a particular preference or order; such additional items are also contemplated, unless otherwise stated. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

It is understood that the above description is intended to be illustrative and not restrictive. Many embodiments as well as many applications besides the examples provided will be apparent to those of skill in the art upon reading the above description. It is further intended that any combination of the features of different aspects or embodiments of the invention may be combined. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A thermal energy storage material system that reproducibly stores and recovers latent heat comprising:
   a. a container having a wall surface; and
   b. a thermal energy storage material in at least partial contact with the wall surface, and including:
      i) at least one first metal containing material including at least one first metal compound that includes a nitrate ion, a nitrite ion, or both; and
      ii) at least one second metal containing material including at least one second metal compound;
   wherein the thermal energy storage material is free of water or includes less than 10 wt. % of water;
   wherein the thermal energy storage material has a liquidus temperature, $T_L$, from about 100° C. to about 250° C.; and
   wherein the thermal energy storage material exhibits a heat storage density from 300° C. to 80° C. of at least 1 MJ/l;
   so that upon being used in a system that generates heat, at least a portion of the heat is captured and stored by the thermal energy storage material and subsequently released for use;
   wherein the thermal energy storage material is encapsulated in a plurality of capsules each having a volume of less than 200 ml,
   the thermal energy storage material includes lithium cations, and
   wherein the absolute value of the change in mass of the wall surface in contact with the thermal energy storage material is less than about 1 g per $m^2$ of the wall surface in contact with the thermal energy storage material after 45 days exposure to the thermal energy storage material at 300° C. in an inert atmosphere.

2. The thermal energy storage material system of claim 1 wherein the thermal energy storage material is enclosed in the container wherein the container has a cavity and the wall surface includes a metal oxide.

3. The thermal energy storage material system of claim 1 wherein the concentration of hydrogen atoms in the thermal energy storage material, if any is present is less than 5 mole %, based on the total concentration of atoms in the thermal energy storage material.

4. The thermal energy storage material system of claim 1 wherein the thermal energy storage material has a value of $H_{C50}/H_{C1}$ greater than 70%, where $H_{C50}$ is defined as the quenched heat of crystallization measured by differential scanning calorimetry at a cooling rate of 50° C./min over a temperature range of $T_L+50°$ C. to $T_L-100°$ C. and $H_{C1}$ is defined as the slow cooled heat of crystallization measured by differential scanning calorimetry at a cooling rate of 1° C./min.

5. The thermal energy storage material system of claim 1 wherein the thermal energy storage material includes lithium nitrate and sodium nitrate.

6. The thermal energy storage material system of claim 1 wherein the thermal energy storage material includes lithium nitrate at a concentration from 35 mole % to 65 mole % based on the total moles of thermal energy storage material.

7. The thermal energy storage material system claim 1 wherein the thermal energy storage material includes sodium nitrate at a concentration from 35 mole % to 65 mole % based on the total moles of thermal energy storage material.

8. The thermal energy storage material system of claim 1 wherein the thermal energy storage material includes a nitrate ion and a nitrite ion.

9. The thermal energy storage material system of claim 1 wherein the thermal energy storage material optionally includes water, wherein the water concentration if any is present is less than 2 wt. % based on the total weight of the thermal energy storage material.

10. The thermal energy storage material system of claim 1 wherein the thermal energy storage material includes a nucleator.

11. The thermal energy storage material system of claim 1 wherein the thermal energy storage material fills 70% or more of the cavity of the container.

12. The thermal energy storage material system of claim 1, wherein the thermal energy storage material includes an anti-corrosion agent.

13. The thermal energy storage material system of claim 1, wherein the thermal energy storage material contains lithium cations at a concentration from 40 mole % to 80 mole % based on the total concentration of cations in the thermal energy storage material.

14. The thermal energy storage material system of claim 1 wherein the thermal energy storage material has a water concentration, if any is present, less than 2 wt. %, based on the total concentration of the thermal energy storage material.

15. The thermal energy storage material system of claim 1 wherein the thermal energy storage material has a liquidus temperature which is less than $T_{min}-25°$ C., wherein $T_{min}$ is the lowest melting temperature of any binary salt which can be formed by any anion of the thermal energy storage material and any cation of the thermal energy storage material.

16. The thermal energy storage material system of claim 1 wherein the total concentration of lithium nitrate and sodium nitrate is greater than 95 wt. % based on the total weight of the thermal energy storage material.

17. The thermal energy storage material system claim 1, wherein the thermal energy storage material is a ternary material having a eutectic composition.

18. The thermal energy storage material system of claim 1, wherein the thermal energy storage material includes a eutectic composition of
   i) a lithium salt selected from the group consisting of lithium nitrate and lithium nitrite; and
   ii) a sodium salt selected from the group consisting of sodium nitrate and sodium nitrite; and
   wherein the thermal energy storage material the water concentration in the thermal energy storage material, if any is present, is less than 2 wt. % based on the total weight of the thermal energy storage material.

19. A method of making a thermal energy storage material system wherein the thermal energy system includes a container having a wall surface and also including a thermal energy storage material in at least partial contact with the wall surface, the thermal energy storage material in turn including i) at least a first metal containing material including at least one first metal compound that includes a nitrate ion, a nitrite ion, or both, and ii) at least a second metal containing material including at least one second metal compound, the thermal energy storage material being free of water or including less than 10 wt. % of water, the thermal energy storage material having a liquidus temperature, $T_L$, from about 100° C. to about 250° C., the thermal energy storage material exhibiting a heat storage density from about 300° C. to about 80° C. of at least 1 MJ/l, the thermal energy storage material being encapsulated in a plurality of capsules each having a volume of less than 200 ml, the thermal energy storage material including lithium cations, wherein the absolute value of the change in mass of the wall surface in contact with the thermal energy storage materials is less than about 1 g per m² of the wall surface in contact with the thermal energy storage material after 45 days exposure to the thermal energy storage material at 300° C. in an inert atmosphere, the method comprising
   heating the thermal energy storage material to a temperature greater than 100° C.; and
   encapsulating the thermal energy storage material in a volume that is substantially free of water.

20. A method for storing and recovering latent heat comprising the steps of:
   a) transferring at least a portion of a source heat from a heat source or a heat collector to a thermal energy storage material system; wherein the thermal energy storage material system includes a thermal energy storage material;
   b) heating the thermal energy storage material using the source heat;
   c) increasing the amount of the liquid phase in the thermal energy storage material by converting at least a portion of the source heat into latent heat;
   d) maintaining the amount of the liquid phase in the thermal energy storage material to store the latent heat;
   e) converting at least a portion of the latent heat into released heat; and
   f) transferring the released heat to an object to be heated;
   wherein the thermal energy storage material system includes a container having a wall surface;
   the thermal energy storage material is in at least partial contact with the wall surface;
   the thermal energy storage material includes
   i) at least one first metal containing material including at least one first metal compound that includes a nitrate ion, a nitrite ion, or both; and
   ii) at least one second metal containing material including at least one second metal compound;
   the thermal energy storage material is free of water or includes less than 10 wt. % of water;
   the thermal energy storage material has a liquidus temperature $T_L$, from about 100° C. to about 250° C.; and
   the thermal energy storage material exhibits a heat storage density from 300° C. to 80° C. of at least 1 MJ/l;
   the thermal energy storage material is encapsulated in a plurality of capsules each having a volume of less than 200 ml,
   the thermal energy storage material includes lithium cations, and
   wherein the absolute value of the change in mass of the wall surface in contact with the thermal energy storage material is less than about 1 g per m² of the wall surface in contact with the thermal energy storage material after 45 days exposure to the thermal energy storage material at 300° C. in an inert atmosphere.

* * * * *